(12) United States Patent
Yamaguchi et al.

(10) Patent No.: US 7,229,213 B2
(45) Date of Patent: Jun. 12, 2007

(54) LINEAR GUIDE DEVICE

(75) Inventors: Toshiaki Yamaguchi, Kanagawa (JP); Soichiro Kato, Kanagawa (JP); Xu Wei, Kanagawa (JP)

(73) Assignee: NSK, Ltd., Tokyo (JP)

( * ) Notice: Subject to any disclaimer, the term of this patent is extended or adjusted under 35 U.S.C. 154(b) by 119 days.

(21) Appl. No.: 10/961,418

(22) Filed: Oct. 7, 2004

(65) Prior Publication Data
US 2005/0190997 A1 Sep. 1, 2005

(51) Int. Cl.
*F16C 29/06* (2006.01)
(52) U.S. Cl. .......................................... 384/45; 384/15
(58) Field of Classification Search .................. 384/15, 384/45
See application file for complete search history.

(56) References Cited
U.S. PATENT DOCUMENTS 5,308,167 A * 5/1994 Tsukada ........................ 384/45
5,575,566 A * 11/1996 Faulhaber ..................... 384/45
5,622,433 A * 4/1997 Suzuki et al. ................. 384/45
6,592,261 B2 * 7/2003 Mochizuki .................... 384/45

* cited by examiner

Primary Examiner—Thomas R. Hannon
(74) Attorney, Agent, or Firm—Levisohn Berger LLP

(57) ABSTRACT

In a linear guide device including: a rail having on either side surface thereof a track recess with a track surface formed thereon; a rail cover covering a rail upper surface of the rail; a saddle-like slider moving linearly on the rail; and a rolling member circulating through a connection path provided in the slider and adapted to roll on the track surface of the rail, the rail cover is equipped with a side edge portion having an engagement portion, an upper track surface serving as an engagement surface is provided in a lower portion of an upper side surface of the rail, the engagement surface being a slope gradually diminishing in the rail width direction downwardly from the upper side surface, and an engagement portion of the rail cover is engaged with the engagement surface, whereby it is possible to achieve an increase in the speed of the rail grinding work for allowing engagement of the rail cover covering the rail upper surface of the liner guide device.

13 Claims, 22 Drawing Sheets

LINEAR GUIDE DEVICE

BACKGROUND OF THE INVENTION

1. Field of the Invention

The present invention relates to a linear guide device provided in a guide portion of a machine, e.g., a machine tool, such as a cutting machine or a grinding machine, or an industrial machine, such as a wood working machine, a cutter, or an injection molding machine, and used to linearly move a movable base, such as a table.

2. Description of the Related Art

In a conventional linear guide device, a saddle-like slider is provided with a connection path, and balls circulating through this connection path are caused to roll on a track surface of a track recess provided on a side surface of a rail so that the slider can move linearly on the rail, and a rail cover whose longitudinal edge portions are bent by an angle smaller than 90 degrees is engaged with an undercut provided on the top of the upper side surfaces on both sides of the rail, preventing intrusion of dust, product chips, etc. by means of seals provided at the front and rear ends with respect to the slider moving direction (see, for example, U.S. Pat. No. 5,575,566).

Further, in another conventional linear guide device, a plate-like rail cover is glued by adhesive to the upper surface of a rail of a similar linear guide device to thereby prevent intrusion of cutting chips or the like (see, for example, JP01-140936 A).

Further, in a still another conventional linear guide device, a rail cover covering the upper surface of a rail of a similar linear guide device is engaged with or screwed to a track surface by means of cover stoppers provided at both ends with respect to the moving direction of a slider (referred to as the slider moving direction) to prevent relative movement of the rail cover and the rail (see, for example, U.S. Pat. No. 6,513,976).

Generally speaking, a track recess forming a track surface provided on a side surface of a rail is formed by grinding, and, to achieve an improvement in machining precision and a reduction in machining man-hours, it is desirable to form the track recess and the side surface at one time by using a form grind stone.

However, in the technique as disclosed in U.S. Pat. No. 5,575,566, a step-like undercut is provided on the top of the rail upper side surface to allow engagement of the rail cover, so that it is necessary to form fine protrusions and recesses on the rail side surface and it is necessary for the form grind stone to be of a configuration with fine protrusions and recesses; to avoid damaging these fine protrusions and recesses during grinding, it is rather difficult to increase the grinding speed, resulting in a deterioration in machining efficiency.

Further, in the technique as disclosed in JP 01-140936A. the plate-like rail cover is glued to the rail upper surface by adhesive to cover the upper surface of the rail, so that, while effective when used in a dry environment, when used in an environment where it is exposed to a water-soluble substance, such as a coolant cutting liquid for use in a machine tool, the device has a problem in that the aqueous solution permeates the adhesive between the plate-like rail cover and the rail upper surface to thereby deteriorate the adhesion property of the adhesive, resulting in the rail cover being raised or detached.

Further, in the technique as disclosed in U.S. Pat. No. 6,513,976, the cover stoppers are engaged with or screwed to the rail track surface to fix the rail cover covering the rail upper surface, so that a dent or flaw due to the pressurizing force or the screw fastening force is generated on the track surface, with the result that the rolling members are subject to damage at the time of movement of the slider or at the time of re-assembly after dismantling, which may lead to generation of noise, an increase in sliding resistance, etc. during sliding movement of the slider.

SUMMARY OF THE INVENTION

The present invention has been made with a view toward solving the above problems in the prior art. It is an object of the present invention to provide a means for achieving an increase in the speed of the rail grinding work for allowing engagement of the rail cover covering the rail upper surface.

It is another object of the present invention to provide a means for, even if used in an environment where it is exposed to a water-soluble substance, maintaining the adhesion property between the rail cover and the rail upper surface, thereby preventing detachment, etc. of the rail cover.

It is still another object of the present invention to provide a means for preventing relative movement of the rail cover and rail without damaging the rail track surface.

To attain the above objects, according to a first aspect of the present invention, there is provided a linear guide device including: a rail having on both side surfaces thereof a track recess with a track surface formed thereon; a rail cover covering a rail upper surface of the rail; a saddle-like slider moving linearly on the rail; and a rolling member circulating through a connection path provided in the slider and adapted to roll on the track surface of the rail, characterized in that the rail cover is equipped with a side edge portion having an engagement portion, an engagement surface is provided in a lower portion of an upper side surface of the rail, the engagement surface being a slope gradually diminishing in a width direction of the rail downwardly from the upper side surface, and that an engagement portion of the rail cover is engaged with the engagement surface.

Further, according to a second aspect of the present invention, the rail cover is equipped with a side edge portion having an engagement portion, an engagement surface is provided in a lower portion of an upper side surface of the rail, the engagement surface being a slope gradually diminishing in a width direction of the rail downwardly from the upper side surface, and an engagement portion of the rail cover is engaged with a corner portion made by the engagement surface and the upper side surface.

Further, according to a third aspect of the present invention, an adhesive tape is provided at least on the rail upper surface of the rail and between the rail upper surface and the rail cover, and the rail cover is bonded to the rail by the adhesive tape.

Further, according to a seventh aspect of the present invention, there is provided a linear guide device including: a rail having on both side surfaces thereof a track recess with a pair of track surfaces formed thereon; a rail cover covering a rail upper surface of the rail; a saddle-like slider moving linearly on the rail; a cover stopper arranged at both ends of the rail with respect to a slider moving direction and adapted to prevent relative movement of the rail cover and the rail in the slider moving direction; and a rolling member rolling on a track surface of the rail, characterized in that the rail cover is bent at both ends with respect to the slider moving direction to form an end bent portion, the cover stopper includes a main body portion, and a pair of leg portions extending in the slider moving direction from the main body portion, the cover stopper being formed as a substantially U-shaped member, a cover stopper leg portion lock portion is provided between the pair of track surfaces, the cover member is arranged at the both ends of the rail, with an inner side of the main body portion of the cover stopper abutting the end bent portion, and that the leg portions of the cover stopper is locked to the cover stopper leg portion lock portion.

Thus, according to the first and second aspects of the present invention, the rail side surface configuration is simplified to simplify the configuration of the grinding surface of the form grind stone for grinding the same, and grinding work at high speed is facilitated, shortening the rail machining time and achieving an improvement in the machining efficiency thereof.

According to the third aspect of the present invention, there is provided, in addition to the above, the following effect: the rail upper surface and the rail cover are bonded to each other by the adhesive tape provided therebetween while being pressurized due to their engagement, and even if the linear guide device is used in an environment where it is exposed to a water-soluble substance such as coolant, it is possible to prevent a deterioration in the adhesion property of the adhesive due to intrusion of the water-soluble substance, and it is possible to prevent, for a long period of time, rising or detachment of the rail cover.

Further, according to the seventh aspect of the present invention, it is possible to lock the cover stopper leg portions in regions other than the track surface on which the rolling members roll, thus making it possible to arrange the cover stopper at either end of the rail without leaving any dent or flaw on the track surface.

DESCRIPTION OF THE PREFERRED EMBODIMENTS

In the following, embodiments of the linear guide device of the present invention will be described with reference to the drawings.

Embodiment 1

Figure 1:
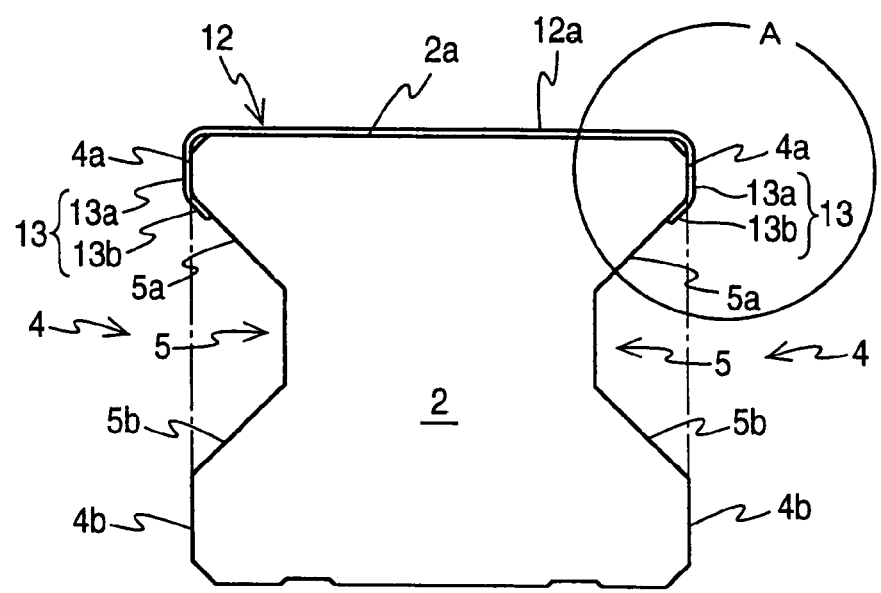
FIG. 1 is a sectional view of a rail cover and a rail according to Embodiment 1 of the present invention.
Figure 2:
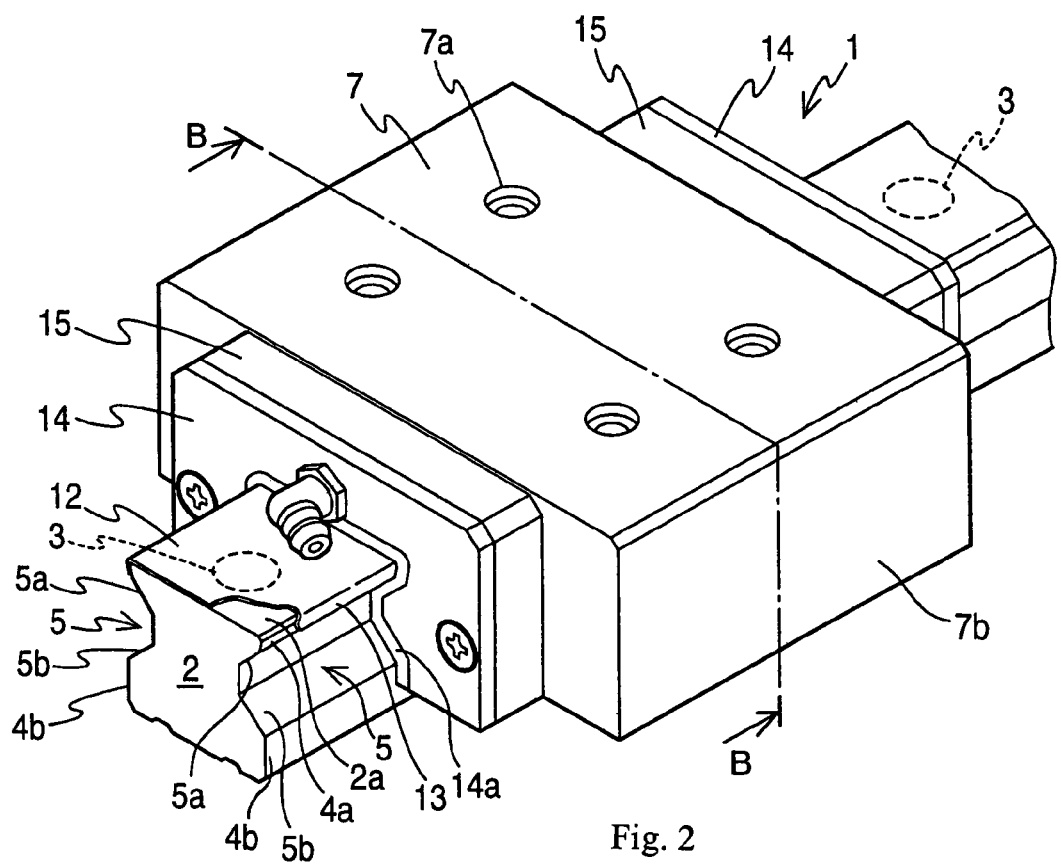
FIG. 2 is a perspective view of a linear guide device according to Embodiment 1.
Figure 3:
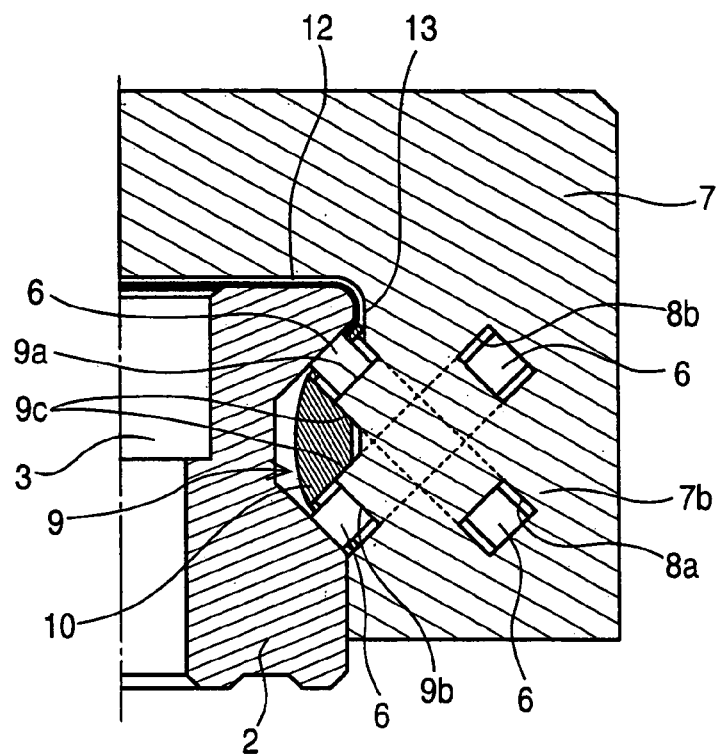
FIG. 3 is a right-hand-side half sectional view taken along the line B—B of FIG. 2.
Figure 4:
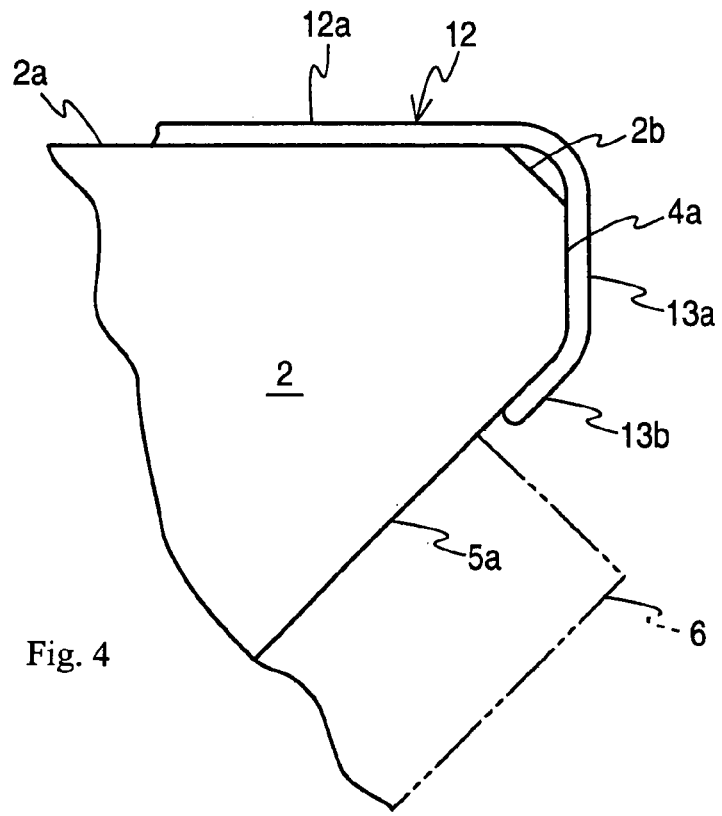
FIG. 4 is an enlarged view of portion A of FIG. 1.

FIG. 1 is a sectional view of a rail cover and a rail according to Embodiment 1; FIG. 2 is a perspective view of a linear guide device according to Embodiment 1; FIG. 3 is a right-hand-side half sectional view taken along the line B—B of FIG. 2; and FIG. 4 is an enlarged view of portion A of FIG. 1.

In FIGS. 1, 2, and 3, reference numeral 1 indicates a linear guide device.

Reference numeral 2 indicates a rail of the linear guide device 1; which is an elongated bar-like member formed of a steel material such as alloy steel and having a substantially I-shaped sectional configuration. In the rail upper surface 2a of the rail, a plurality of stepped bolt holes 3 for fixing the rail 2 to the base or the like of a machine, such as a machine tool, are provided at a predetermined pitch.

Each side surface 4 of the rail 2 has an upper side surface 4a, with an upper track surface 5a provided under the upper side surface 4a that is a slope gradually diminished downwards from the upper side surface 4a in the width direction of the rail 2, and a lower side surface 4b, with a lower track surface 5b provided at the top of the lower side surface 4b that is a slope gradually diminished upwards from the lower side surface 4b in the width direction of the rail 2. The upper track surface 5a and the lower track surface 5b form a track recess 5 which is a substantially V-shaped recess extending in the longitudinal direction thereof substantially at the center of the side surface 4 of the rail 2.

Runners 6 as rolling members roll respectively on the upper track surface 5a and on the lower track surface 5b of the track recess 5.

The portion of the upper track surface 5a in the vicinity of the corner formed by itself and the upper side surface 4a functions as an engagement surface which is engaged with an engagement portion 13b of a rail cover 12 described below.

Further, the upper side surface 4a and the lower side surface 4b of each side of the rail 2 are formed so as to be flush with each other, that is, such that the rail width between the upper side surfaces 4a and the rail width between the lower side surfaces 4b are the same.

Reference numeral 7 indicates a slider; which is a saddle-like member with a substantially U-shaped sectional configuration formed of a steel material, such as alloy steel. In the upper surface of the slider, there are provided stopped screw holes 7a, by means of which the movable table or the like of a machine, such as a machine tool, is fastened using bolts or the like.

Further, in both sidewalls 7b of the slider 7, there are provided connection paths 8a and 8b with a rectangular sectional configuration inclined by substantially 45 degrees for circulating the runners 6 shown in FIG. 3; in each inner side surface of the connection paths 8a and 8b, there is formed a rolling portion 9 composed of rolling surfaces 9a and 9b respectively opposed by means of the runners 6 to the upper track surface 5a and the lower track surface 5b of the track recess 5 of the rail 2.

The connection path 8a is connected to a rolling path formed by the upper track surface 5a of the track recess 5 of the rail 2 and the rolling surface 9a of the rolling portion 9 of the slider 7, and the connection path 8b is connected to a rolling path formed by the lower track surface 5b of the track recess 5 of the rail 2 and the rolling surface 9b of the rolling portion 9 of the slider 7; sealed in each of those circulation rolling paths thus formed are a plurality of runners 6 and a predetermined amount of lubricant, such as grease, the runners 6 rolling while circulating. The same is true of the opposite side wall 7b. Due to this arrangement, the slider 7 is supported by the rail 2 so as to be capable of making linear reciprocating movements.

When providing the connection paths 8a and 8b and the rolling portions 9 in the slider 7, it is possible to appropriately separate the components for the sake of convenience in production, assembling them together by fastening means, such as bolts, to form the slider 7. In this case, the main body of the slider 7 may be formed of a steel material, or a relatively soft metal material, or a resin material.

Reference numeral 10 indicates a retaining member, which is formed of a metal material, a resin material or the like, and is fitted into a V-shaped groove 9c of the rolling portion 9 of the slider 7 to retain the runners 6, preventing them from being detached.

Reference numeral 12 indicates a rail cover, which is formed of an elastic thin plate of alloy steel or the like in a length substantially equal to the longitudinal length of the rail 2. As shown in FIG. 4, each side edge portion 13 of the rail cover, extending in the longitudinal direction, is bent by press working or the like into a configuration in conformity with the upper side surface 4a of the rail 2 and the upper track surface 5a of the track recess 5, to be formed into a cover side surface 13a, which is a vertical surface, and an engagement portion 13b, which is a slope; the portion between the both cover side surfaces 13a is formed as a flat surface extending along the upper surface 2a of the rail 2, and, as shown in FIG. 1, utilizing the elasticity of the rail cover 12, the engagement portions 13b are engaged with the upper track surfaces 5a serving as the engagement surfaces of the rail 2, thus effecting attachment of the rail cover.

The rail cover 12 of this embodiment is formed of a stainless steel with a thickness of 0.2 mm or more, more preferably, 0.25 to 0.3 mm, e.g., SUS301CPS or SUS304CSP, and both cover side surfaces 13a thereof are bent into rounded portions R smaller than the beveled portions 2b of the corner portions of the rail upper surface 2a and of the rail 2 the upper side surfaces 4a to thereby shape the cover side surfaces 13a. Further, the engagement portions 13b are bent so as to extend along the upper track surfaces 5a to form the side edge portions 13.

The angle made by the engagement portions 13b of the rail cover 12 after the bending is made smaller by approximately 5 degrees than the clip angle made of the upper side surfaces 4a and the engagement surfaces, whereby the close contact between the rail cover 12 and the rail 2 after the attachment of the rail cover 12 can be made appropriate.

Further, to make the attachment property of the rail cover 12 satisfactory, the end portions of the engagement portions 13b are prevented as much as possible from getting inwards from the cover side surfaces 13a without impairing the close contact property. In this case, care must be taken so that the end portions of the engagement portions 13b may not interfere with the rolling routes for the runners 6 on the upper track surfaces 5a.

Reference numeral 14 indicates side seals, which consist of cores formed of a plate material, such as alloy steel, with seal portions 14a of an elastic material, such as natural rubber or a synthetic rubber, being formed thereon, and the seal portions 14a remaining in contact with the surface of the outer contour of the rail 2 and the rail cover 12 and slide thereon as the slider 7 reciprocates.

Reference numeral 15 indicates end caps, which are formed of a metal material, a resin material or the like, and are fastened to the front and rear ends of the slider with respect to the sliding direction thereof by means of screws or the like together with the side seals 14 arranged on the outer side of the end caps.

When attaching the rail cover 12 so as to cover the upper surface 2a of the rail 2, the rail cover 12 is inclined to one of the upper track surfaces 5a constituting the engagement surfaces of the track recesses 5, so as to engage one engagement portion 13b to the upper track surfaces 5a; in this state, the cover side surface 13a on the other side is expanded utilizing its elasticity, and the other engagement portion 13b is engaged with the other upper track surface 5a to thereby attach the rail cover 12 to the rail 2.

As a result, the rail cover 12 covers the entire upper surface 2a of the rail 2, and due to the seal portions 14a of the side seals 14 sliding on the lower side surfaces 4b, the track recesses 5, and the rail cover 12, it is possible to prevent intrusion of dust and production chips consisting of iron, aluminum, wood, etc. into the stepped bolt holes 3 and the track recesses 5.

In this case, when the thickness of the rail cover 12 is approximately 0.15 mm, it is been confirmed through experiment that the portions of the rail cover 12 covering the stepped bolts 3 of the rail 2 are deformed to sink by the pressurizing force due to the sliding of the side seals 14 to form dents, where production chips, etc. remain, making it difficult to maintain the production chip removing action of the side seals 14; thus, in this embodiment, the thickness of the rail cover 12 is set to 0.25 to 0.3 mm to prevent deformation of the upper surface 12a of the rail cover 12.

The shaping of the side surfaces 4 of the rail 2 of this embodiment is effected at one time using a form grind stone with a grinding surface in conformity with each side surface configuration. In this case, the grinding surface of the form grind stone has a simple configuration without any fine protrusions and recesses, so that it is possible to perform grinding easily at high speed while preventing fracture of the grind stone.

Further, quenching such as high-frequency quenching is usually effected on the side surfaces 4 of the rail 2; in this regard, when there is a shortage in the vertical length of the upper side surfaces 4a or they have fine protrusions and recesses, heat is concentrated on those portions at the time of heating for quenching, which is likely to lead to a defect. In view of this, the side surfaces 4 are formed in a simple configuration, and an appropriate vertical length is imparted to the upper side surfaces 4a, whereby generation of cracking is prevented, thus mitigating a defect due to quenching.

As described above, in this embodiment, the engagement portions of the rail cover are engaged, utilizing the elasticity thereof, with the upper track surfaces serving as engagement surfaces provided under the upper side surfaces of the rail of the linear guide device and consisting of slopes gradually diminished downwards, whereby the side surface configuration of the rail is simplified, and the configuration of the grinding surface of the form grind stone for shaping it is simplified, making it possible to facilitate the grinding at high speed and shorten the rail working time to thereby achieve an improvement in machining efficiency.

Further, since the side seals are caused to slide on the simplified outer peripheral surface formed by the rail and the rail cover, the seal portions of the side seals can be easily formed, making it possible to produce the side seals at low cost and to obtain a sufficient dust-proof property against intrusion of dust, product chips, etc.

Further, the upper side surfaces and the lower side surfaces of the rail are formed so as to be flush with each other, so that, in the inspection process in the production of the rail, when one upper side surface and one lower side surface are placed on the inspection table, the other side surfaces are horizontal, thereby facilitating the inspecting operation.

Embodiment 2

Figure 5:
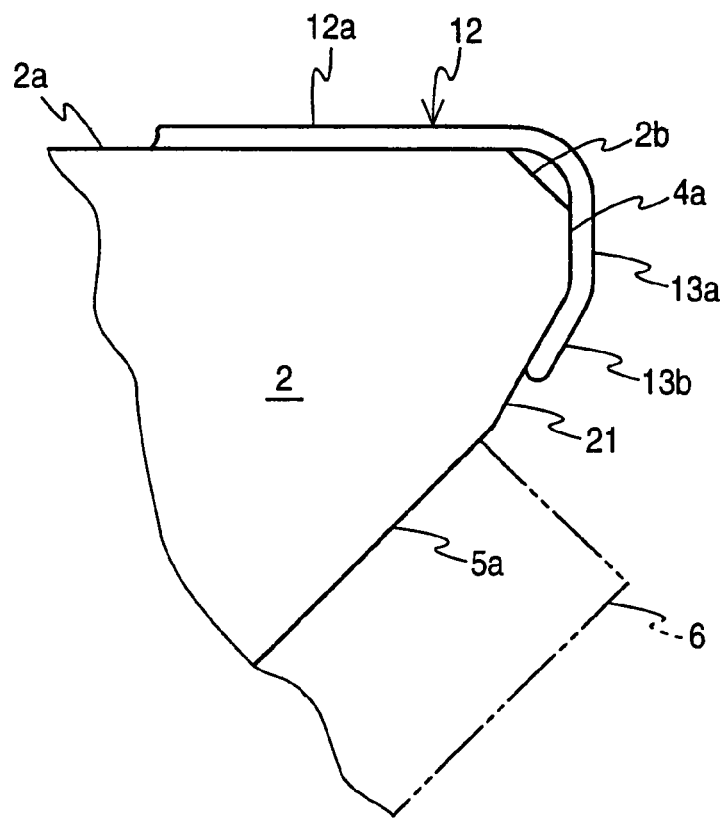
FIG. 5 is a partial enlarged view of a rail and a rail cover according to Embodiment 2 of the present invention.

FIG. 5 is a partial enlarged view of a rail and a rail cover according to Embodiment 2.

The components that are the same as those of Embodiments 1 is indicated by the same reference numerals, and a description thereof will be omitted.

Reference numeral 21 indicates inclined surfaces serving as engagement surfaces, which are slopes provided under the upper side surfaces 4a on both sides of the rail 2 and gradually diminished downwards from the upper side surfaces 4a in the width direction of the rail 2, with the engagement portions 13b of the rail cover 12 engaging with the engagement surfaces 21 due to the elasticity thereof.

In this embodiment, the inclined surfaces 21 are provided at the corner portions made by the upper side surfaces 4a and the upper track surfaces 5a of the track recesses 5; the upper side surfaces 4a are vertical surfaces, and the inclined surfaces 21 are inclined by 30 degrees with respect to the vertical direction, and the upper track surfaces 5a are inclined by 45 degrees with respect to the vertical direction, such that the inclined surface 21 and the corner portions of the upper track surfaces 5a do not interfere with the rolling routes for the runners 6.

When the inclination angle of the inclined surfaces 21 are set to 25 to 35 degrees with respect to the vertical direction, there is no fear of the close contact property and attachment property of the rail cover 12 being impaired.

Further, the engagement portions 13b of the side edge portions 13 of the rail cover 12 are bent so as to extend along the inclined surfaces 21, so that the bending angle of the engagement portions 13b is smaller than that in Embodiment 1.

In this way, by providing the inclined surfaces 21 at the corner portions made by the upper side surfaces 4a of the rail side surface 4 and the upper track surfaces 5a of the track recesses 5, it is also possible to simplify the side surface configuration of the rail 2.

When attaching the rail cover 12 so as to cover the upper surface 2a of the rail 2, the rail cover 12 is inclined and one engagement portion 13b is engaged with one of the inclined surfaces 21; in this state, the cover side surface 13a on the other side is expanded utilizing its elasticity, and the other engagement portion 13b is engaged with the other inclined surface 21 to thereby attach the rail cover 12 to the rail 2. As a result, the rail cover 12 covers the entire upper surface 2a of the rail 2, and it is possible to prevent intrusion of dust and production chips into the stepped bolt holes 3 and each of the track surfaces of the track recesses 5.

As described above, in this embodiment, in addition to the effect of Embodiment 1, inclined surfaces are provided at the corner portions made by the upper side surfaces of the rail and the upper track surfaces of the track recesses so that the engagement portions of the rail cover can be bent at a smaller bending angle, whereby it is possible to further improve the attachment property of the rail cover with respect to the rail.

Embodiment 3

Figure 6:
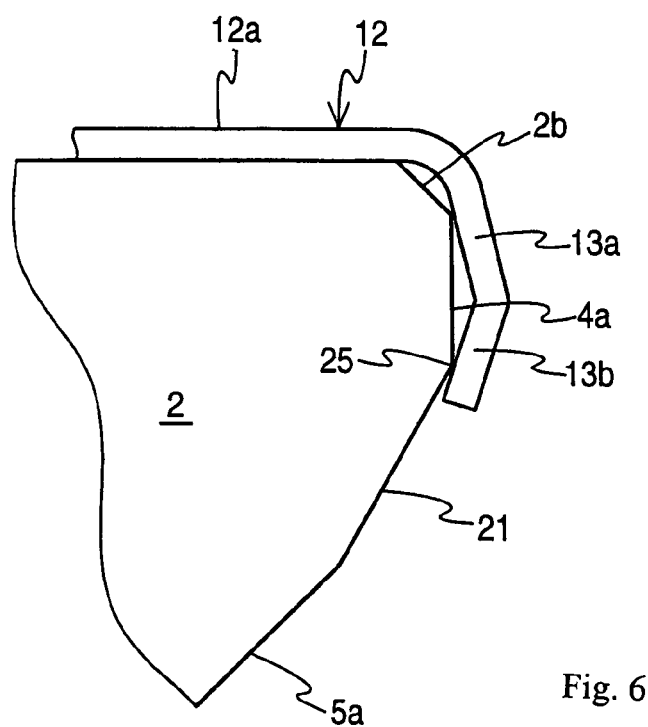
FIG. 6 is a partial enlarged view of a rail and a rail cover according to Embodiment 3 of the present invention.

FIG. 6 is a partial enlarged view of a rail and a rail cover according to Embodiment 3.

The components that are the same as those of Embodiments 1 and 2 are indicated by the same reference numerals, and a description thereof will be omitted.

The rail 2 and the rail cover 12 of this embodiment are the same as the rail 2 and the rail cover 12 of Embodiment 2 except that the engagement portions 13b of the side edge portions 13 of the rail cover 12 are engaged with the apex portions of corner portions 25 made by the inclined surfaces 21 serving as the engagement surfaces and the upper side surfaces 4a or rounded portions provided at the corner portions 25.

Thus, the vertical length of the cover side surfaces 13a of the rail cover 12 is formed to be smaller than the length of the cover side surfaces 13a in Embodiment 2.

As a result, in addition to the effect of Embodiment 2, the engagement portions of the rail cover are engaged with the corner portions made by the inclined surfaces and the upper side surfaces, so that it is possible to more effectively utilize the elasticity of the side edge portions of the rail cover, making it possible to further enhance the close contact property of the rail cover with respect to the rail.

Further, it is possible to relax the bending precision for the engagement portions, thereby facilitating the production of the rail cover.

Figure 7:
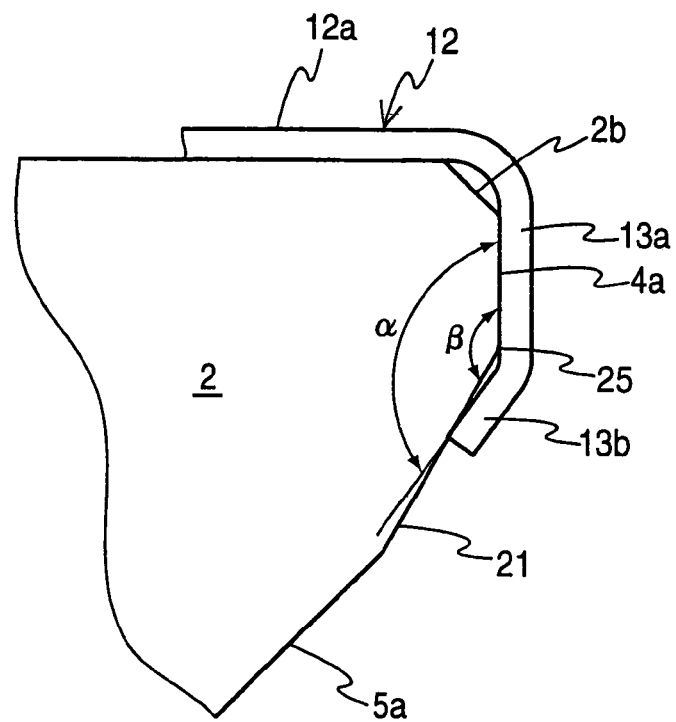
FIG. 7 is a partial enlarged view of a rail and a rail cover according to a modification of Embodiment 3.

FIG. 7 is a partial enlarged view of a modification of the rail cover of Embodiment 3.

The components that are the same of those of Embodiment 3 are indicated by the same reference numerals, and a description thereof will be omitted.

The bending angle α of the engagement portions 13b of the side edge portions 13 of the rail cover 12 of this embodiment is formed to be smaller than the angle β of the corner portions 25 made by the inclined surfaces 21 and the upper side surfaces 4a, and the portions near the forward ends of the engagement portions 13b of the rail cover 12 are engaged with the inclined surfaces 21 serving as the engagement surfaces.

Thus, the vertical length of the cover side surfaces 13a of the rail cover 12 is larger than the length of the cover side surfaces 13a of Embodiment 2.

Thus, in addition to the effect of Embodiment 2, the engagement portions of the rail cover is bent at a bending angle smaller than the angle made by the inclined surfaces and the upper side surfaces, so that it is possible to more effectively utilize the elasticity of the engagement portions of the rail cover, making it possible to further enhance the close contact property of the rail cover with respect to the rail.

Further, it is possible to relax the bending precision for the engagement portions, thereby facilitating the production of the rail cover.

While the above-described rail cover shown in FIGS. 6 and 7 is applied to the rail of Embodiment 2, it is also possible to apply the same to the rail covers of Embodiment 1 and those of Embodiments 4 and 5 described below.

Embodiment 4

Figure 8:
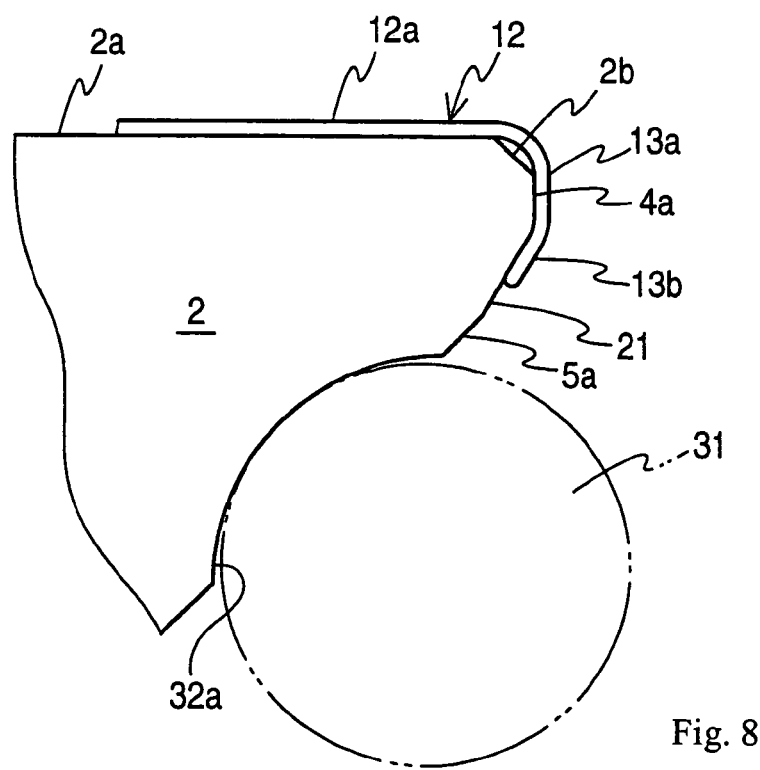
FIG. 8 is a partial enlarged view of a rail and a rail cover according to Embodiment 4 of the present invention.

FIG. 8 is a partial enlarged view of a rail and a rail cover according to Embodiment 4.

The components that are the same as those of Embodiments 1 and 2 are indicated by the same reference numerals, and a description thereof will be omitted.

The linear guide device 1 of this embodiment uses balls 31 as rolling members, and the upper track surfaces 5a and the lower track surfaces 5b of the track recesses 5 of the rail 2 are equipped with rail track grooves 32a and 32b on which the balls 31 roll.

In this embodiment, as in Embodiment 2, at the corner portions made by the upper side surfaces 4a and the upper track surfaces 5a, there are provided the inclined surfaces 21 serving as the engagement surfaces, and the rail cover 12 is attached to the rail 2 in the same manner as in Embodiment 2.

As described above, with the rail of a linear guide device using balls as rolling members, it is also possible to obtain the same effect as that of Embodiment 2.

In this embodiment, when the upper track surfaces are used as the engagement surfaces, it is possible to obtain the same effect as that of Embodiment 1.

Figure 9:
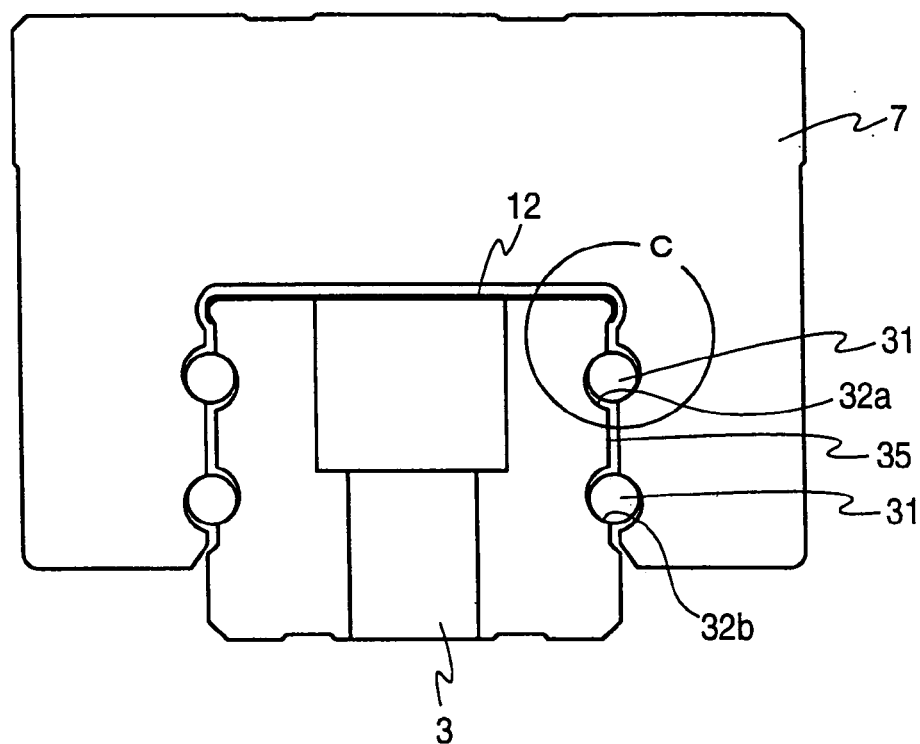
FIG. 9 is a sectional view of another linear guide device using balls.

FIG. 9 shows a case in which the present invention is applied to the rail 2 of another linear guide device 1 using balls 31 as rolling members.

Figure 10:
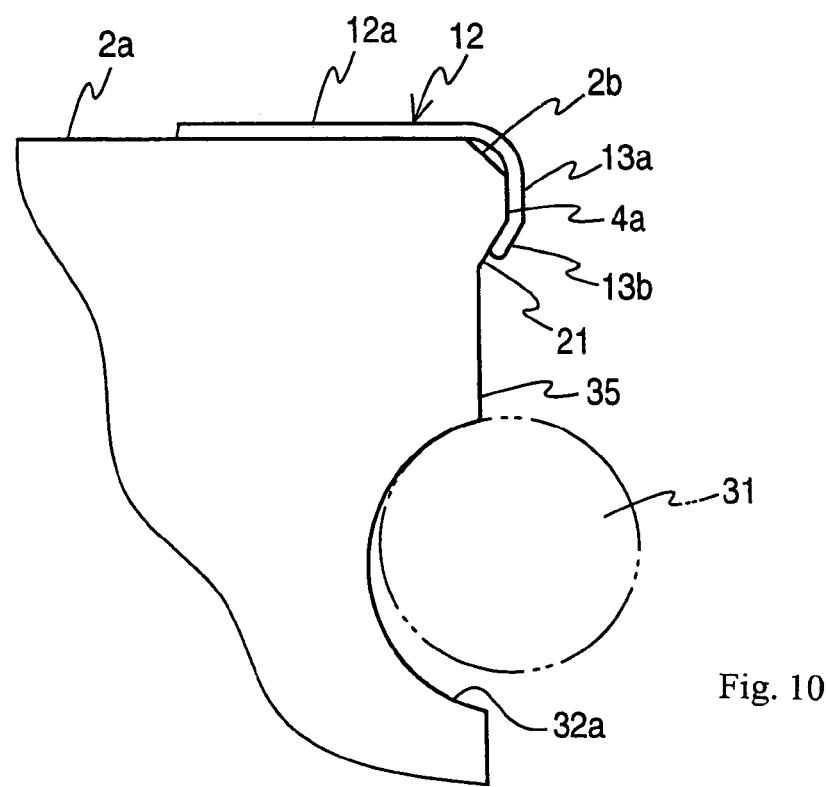
FIG. 10 is an enlarged view of portion C of FIG. 9.

FIG. 9 is a sectional view of another linear guide device using balls; and FIG. 10 is an enlarged view of portion C of FIG. 9.

The components that are the same as those of Embodiments 1, 2, and 4 are indicated by the same reference numerals, and a description thereof will be omitted.

In FIGS. 9 and 10, reference numeral 35 indicates track recesses provided in the side surface 4 of the rail 2, at the bottom of each of the track recesses there are formed two rows of rail track grooves 32a and 32b for the balls 31.

The number of rows of rail track grooves for the balls 31, provided at each track recess 35, is not restricted to two; it may also be three or more.

At the corner portions made by the track recesses 35 and the upper side surfaces 4a, there are provided the inclined surfaces 21 serving as engagement surfaces gradually diminished downwards from the upper side surfaces 4a in the width direction of the rail 2, and, as in Embodiment 4, the engagement portions 13b of the rail cover 12 are engaged therewith.

Thus, with the rail of another type of linear guide device using balls as rolling members, it is also possible to obtain the same effect as that of Embodiment 2.

Embodiment 5

Figure 11:
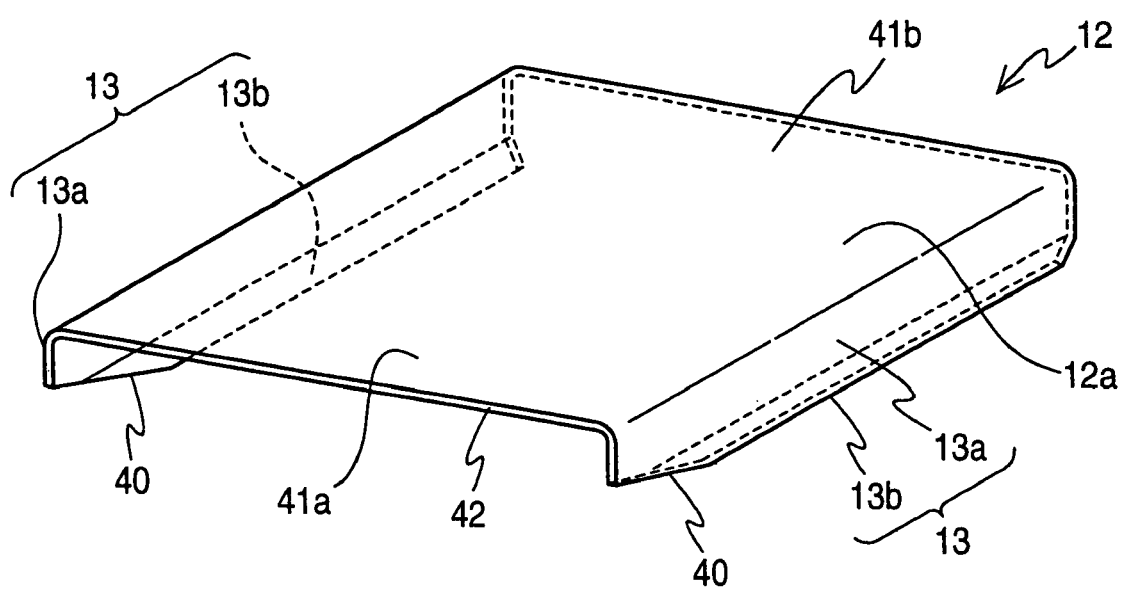
FIG. 11 is a perspective view of a rail cover according to Embodiment 5 of the present invention.

FIG. 11 is a perspective view of a rail cover according to Embodiment 5.

The components that are the same as those of Embodiments 1 is indicated by the same reference numerals, and a description thereof will be omitted.

In the drawing, reference numeral 40 indicates cutouts; they are formed by partially cutting out both of the side edge portions 13 of the rail cover 12 obliquely from both side ends of the front end portion 41a or the rear end portion 41b with respect to the slider moving direction such that they diverge toward the cover end surface 42 as seen sidewise.

In this embodiment, the cutouts 40 are provided in the engagement portions 13b of both side edge portions 13 of the front end portion 41a.

The operation of this embodiment, constructed as described above, will be illustrated.

When attaching the rail cover 12 to the upper surface 2a of the rail 2, the front end portion 41a is placed on the upper surface 2a of the rail 2, and the cover side surfaces 13a are fitted onto the upper side surfaces 4a of both sides of the rail 2, with the rail cover 12 being pushed in obliquely in the slider moving direction.

At this time, the cutouts 40 provided in the engagement portions 13b of the side edge portions 13 are pushed open due to their slopes, guiding the engagement portions 13a smoothly to the engagement surfaces of the rail 2; by further pushing in the rail cover, both engagement portions 13a can be easily engaged with the engagement surfaces, making it possible to easily attach the rail cover 12 to the rail 2.

As described above, when applied to the above embodiments, the rail cover of this embodiment provides, in addition to the effect of Embodiment, the following effect: due to the provision of the cutouts formed by cutting the end portions of the side edge portions obliquely toward the cover end surface, it is possible to guide the engagement portions smoothly to the engagement surfaces of the rail, so that the rail cover can be attached to the rail easily.

While in the above-described example the cutouts are provided at the front end, it is also possible to provide them at the rear end or at both ends; the above effect can be obtained by providing them at least at one of the front and rear ends.

Further, while in the above-described example the cutouts are provided by cutting out the engagement portions, it is also possible for the cutouts to be provided so as to include the cover side surfaces; in brief, the same effect as described above can be obtained by obliquely cutting out part of the side edge portions.

Embodiment 6

Figure 12:
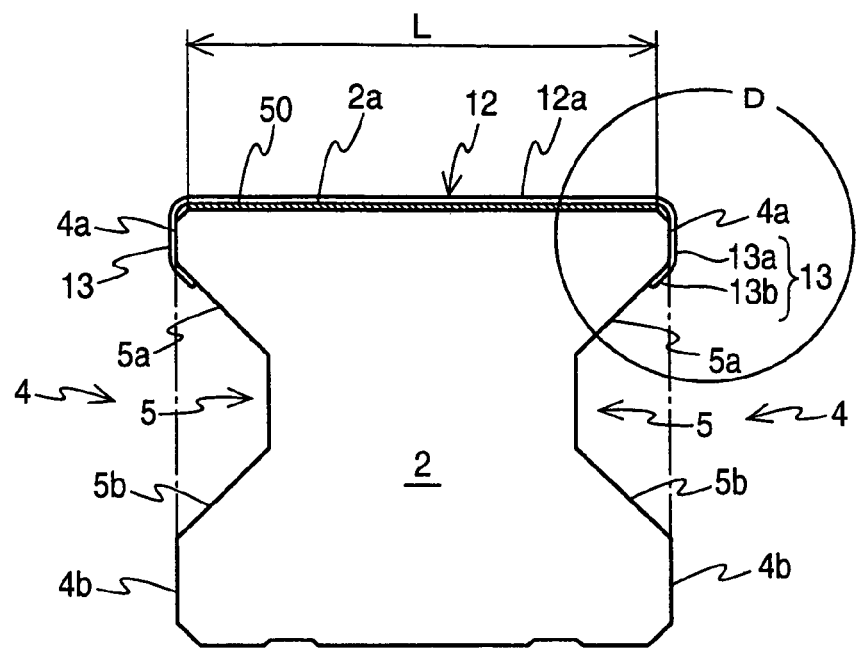
FIG. 12 is a sectional view of a rail cover and a rail according to Embodiment 6 of the present invention.
Figure 13:
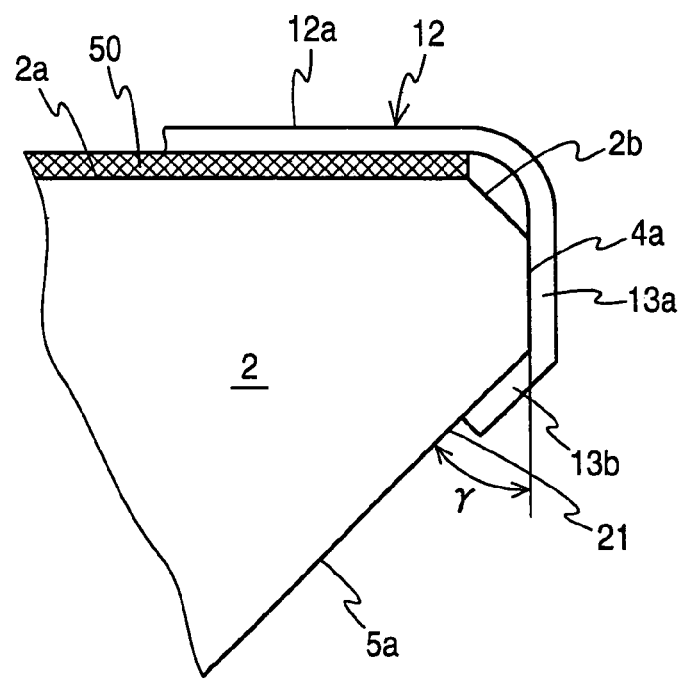
FIG. 13 is an enlarged view of portion D of FIG. 12.
Figure 14:
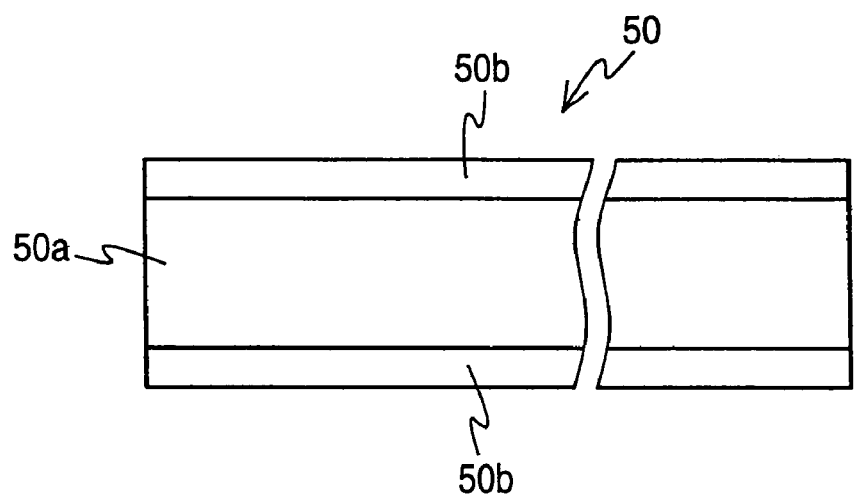
FIG. 14 is a sectional view of an adhesive tape according to Embodiment 6.

FIG. 12 is a sectional view of a rail cover and a rail according to Embodiment 6; FIG. 13 is an enlarged view of portion D of FIG. 12; FIG. 14 is a sectional view of an adhesive tape according to Embodiment 6.

The components that are the same as those of Embodiments 1 are indicated by the same reference numerals, and a description thereof will be omitted.

In FIGS. 12 and 13, reference numeral 50 indicates an adhesive tape; it has a base member 50a having a width substantially the same as the inner central width of the cover 12 indicated by L in FIG. 12, that is, a width substantially the same as the width of the flat surface extending along the rail upper surface 2a; as shown in FIG. 14, entirely applied to both sides of the base member 50a, which consists of a waterproof acrylic foam or film or the like, is an adhesive agent 50b superior in adhesion property and watertightness, e.g., a silicone type or acrylic type adhesive, thus forming a tape whose both sides have adhesion property.

Taking into account corrosion prevention and elasticity, the rail cover 12 of this embodiment consists of a stainless steel plate material, e.g., a plate material in conformity with the standards of various nations like JIS Standards, such as SUS301CPS or SUS304CSP, DIN Standards, etc.; both side portions of the plate member with respect to the width direction of the rail 2, formed of such a plate material, are bent at a predetermined inner roundness so as to extend along the upper side surfaces 4a of the rail 2, thereby forming the cover side surfaces 13a; further, the engagement portions 13b are bent so as to extend along the upper track surfaces 5a serving as the engagement surfaces, thus forming the side edge portions 13.

The angle γ of the engagement portions 13b of the rail cover 12 after the bending, shown in FIG. 13, is preferably set to 30 to 90 degrees. Due to this arrangement, after the attachment of the rail cover 12, the rail cover 12 pressurizes the upper surface 2a of the rail 2, and the close contact state of the rail cover 12 and the upper surface 2a of the rail 2 and the adhesive tape 50 provided therebetween, can be maintained in an appropriate manner.

Further, to make the adhesion property of the rail cover 12 satisfactory, the end portions of the engagement portions 13b are prevented as much as possible from getting inwards from the cover side surfaces 13a without impairing the close contact property. In this case, care must be taken so that the end portions of the engagement portions 13b may not interfere with the rolling routes for the runners 6 on the upper track surfaces 5a.

When attaching the rail cover 12 so as to cover the upper surface 2a of the rail 2, one surface of the adhesive tape 50 is glued to the inner side of the rail cover 12 by means of the adhesive agent 50b, and the rail cover 12 is inclined to engage the engagement portion 13b of one side edge portion 13 with the upper track surface 5a as an engagement surface of one track recess 5 of the rail 2, and, in this state, the side edge portion 13 on the other side is pushed open utilizing its elasticity to engage the other engagement portion 13b with the other upper track surface 5a, thus attaching the rail cover 12 to the rail 2.

As a result, as shown in FIG. 12, after the attachment of the rail cover 12, the rail cover 12 and the upper surface 2a of the rail 2 are attached to each other by means of the adhesive tape 50, with the rail cover 12 pressurizing the upper surface 2a of the rail 2, and the rail cover 12 covers the entire upper surface 2a of the rail 12, thus making it possible to prevent intrusion of dust and production chips, such as iron, aluminum, or wood, into the stepped bolt holes 3 and the track recesses 5 by means of the seal portions 14a of the side seals 14 sliding on the lower side surfaces 4b, the track recesses 5, and the rail cover 12.

Further, due to the arrangement in which the engagement portions 13b of the rail cover 12 and the upper track surfaces 5a of the rail 2 are engaged with each other and in which the adhesive tape 50 is provided between the rail cover 12 and the upper surface 2a of the rail 2 while applying pressurizing force due to its elasticity, it is possible to prevent the rail cover 12 from rising by the adhesive force of the adhesive tape 50, and, even when the linear guide device 1 is used in an environment where it is exposed to a water-soluble substance, such as coolant, it is possible to restrain intrusion of the water-soluble substance between the rail cover 12 and the upper surface 2a of the rail 2, thereby preventing a deterioration in the adhesion property of the adhesive agent 50b of the adhesive tape 50.

Further, even when the adhesion property of the adhesive agent 50b has been deteriorated after use in the above environment for a long period of time, due to the elasticity of the engagement portions 13b of the rail cover 12, the reduction and deterioration in adhesion property of the adhesive agent 50b is compensated for, making it possible to prevent, for a long period of time, the rail cover 12 from rising or being detached.

As described above, in addition to the effect as obtained in Embodiment 1, in this embodiment, the engagement portions provided in the side edge portions of the rail cover are engaged with the upper rolling tracks serving as the rail engagement surfaces, and the upper surface of the rail and the rail cover are bonded to each other by the adhesive tape provided between the upper surface of the rail and the rail cover, whereby the upper surface of the rail and the rail cover are bonded to each other while being pressurized due to the engagement of the rail cover, and, even when the linear guide device is used in an environment where it is exposed to a water-soluble substance, such as coolant, it is possible to prevent a deterioration in the adhesion property of the adhesive agent due to intrusion of the water-soluble substance, and to prevent, for a long period of time, the rail cover from rising or being detached.

Embodiment 7

Figure 15:
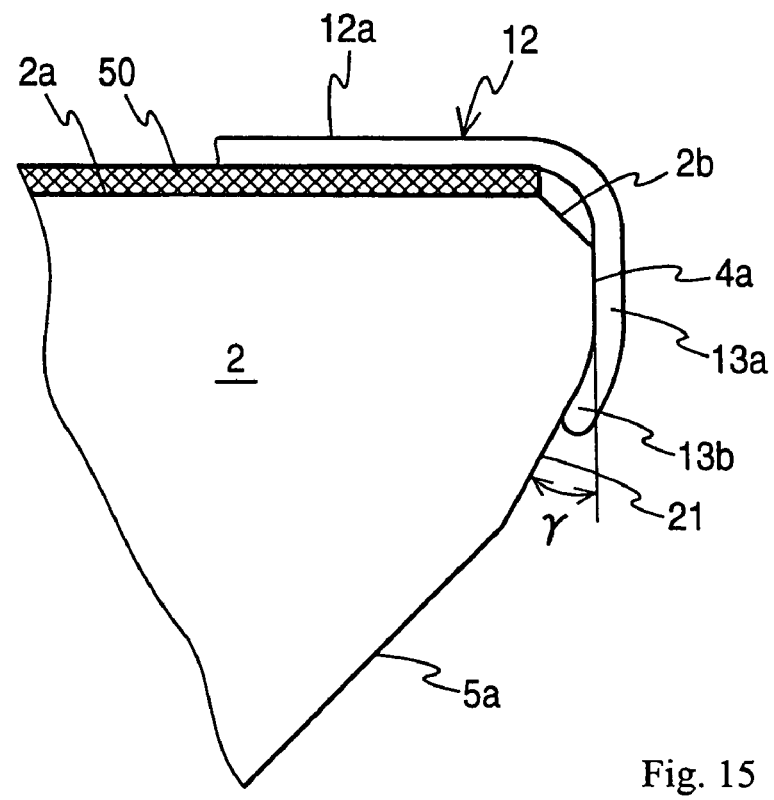
FIG. 15 is a partial enlarged view of a rail and a rail cover according to Embodiment 7 of the present invention.

FIG. 15 is a partial enlarged view of a rail and a rail cover according to Embodiment 7.

The components that are the same as those of Embodiments 1, 2, and 6 are indicated by the same reference numerals, and a description thereof will be omitted.

In this embodiment, the inclined surfaces 21 serving as the engagement surfaces are formed in the same manner as in Embodiment 2.

As in Embodiment 6, the angle γ of the engagement portions 13b of side edge portions 13 of the rail cover 12 after the bending is preferably set to 30 to 90 degrees.

Further, the engagement portions 13b of the side edge portions 13 of the rail cover 12 are bent so as to extend along the inclined surfaces 21, so that they are bent by a smaller bending angle than the engagement portions 13b of Embodiment 6.

In this way, by providing the inclined surfaces 21 at the corner portions made by the upper side surfaces 4a of the side surfaces 4 of the rail and the upper track surfaces 5a of the track recesses 5, it is also possible to bond the rail cover 12 to the upper surface 2a of the rail cover 12 while pressurizing the adhesive tape between the rail cover 12 and the upper surface 2a of the rail 2 due to the elasticity of the engagement portions 13b of the rail cover 12.

The operation of attaching the rail cover 12 so as to cover the upper surface 2a of the rail 2 is the same as that of Embodiment 6 except that the engagement portions 13b of the rail cover 12 are engaged with the inclined surfaces 21, so that a description thereof will be omitted.

As described above, in this embodiment, the inclined surfaces are provided at the corner portions made by the upper side surfaces of the rail and the upper track surfaces of the track recesses so that the engagement portions of the rail cover can be bent by a smaller bending angle, whereby, in addition to the effect of Embodiment 6, it is possible to further improve the attachment property of the rail cover with respect to the rail.

Figure 16:
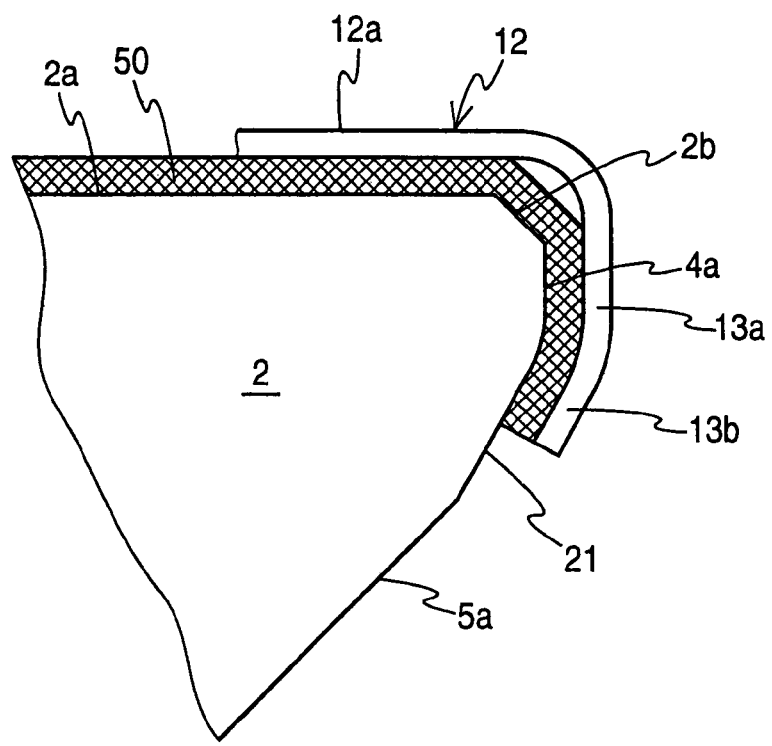
FIG. 16 is a partial enlarged view of a rail and a rail cover according to a modification of Embodiment 7.

The adhesive tape 50 may be of the type as shown in FIG. 16.

FIG. 16 is a partial enlarged view of a rail and a rail cover according to a modification of Embodiment 7.

The adhesive tape 50 of this modification is a tape having adhesion property on both sides formed by applying an adhesive agent 50b superior in adhesion property and water-tightness to overall both surfaces of a base member 50a whose entire length corresponds to the inner entire length of the rail cover 12, that is, a width substantially the same as the width of the rail cover 12, and which is waterproof.

The adhesive tape 50, whose width corresponds to the material width of the rail cover 12, is glued to the entire inner surface of the rail cover 12, and, as shown in FIG. 16, placed between the upper surface 2a of the rail 2, the upper side surfaces 4a, the inclined surfaces 21 serving as the engagement surfaces, and the rail cover 12, wherein the rail 2 and the rail cover 12 are bonded to each other while pressurizing the upper portion of the rail 2 by utilizing the elasticity of the rail cover 12, thereby attaching the rail cover 12 to the upper portion of the rail 2.

This helps to obtain the same effect as that of Embodiment 7, and, at the same time, it is possible to make firmer the bonding of the rail cover 12 and the rail 2.

The same is true of the case in which the adhesive tape 50 of this modification with the material width of the rail cover 12 is applied to the rail 2 of Embodiment 6. In this case, the adhesive tape 50 for the engagement portions 13b of the rail cover 12 are bonded to the upper track surfaces 5a serving as the engagement surfaces while being pressurized.

Embodiment 8

Figure 17:
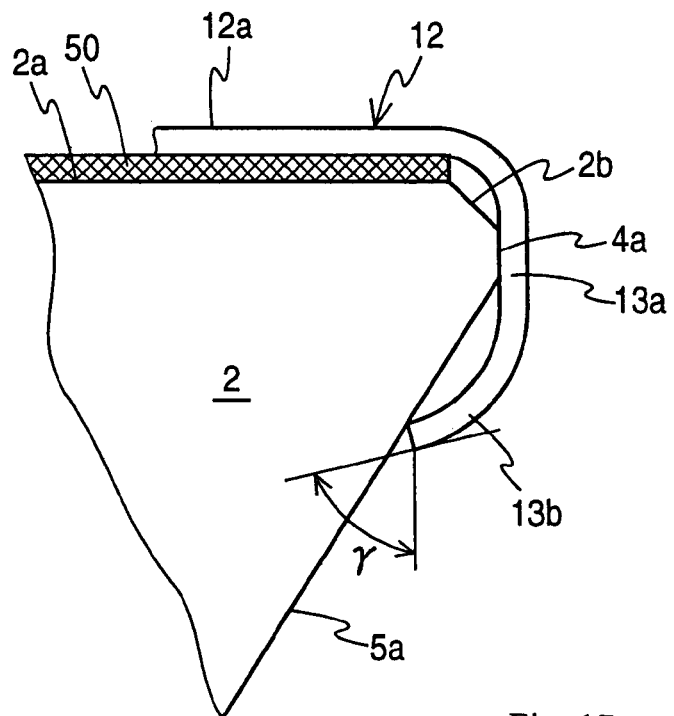
FIG. 17 is a partial enlarged view of a rail and a rail cover according to Embodiment 8 of the present invention.

FIG. 17 is a partial enlarged view of a rail and a rail cover according to Embodiment 8.

The components that are the same as those of Embodiments 1 and 6 are indicated by the same reference numerals, and a description thereof will be omitted.

The engagement portions 13b of the side edge portions 13 of the rail cover 12 of this embodiment are shaped into an arcuate configuration after forming the cover side surfaces 13a in the same manner as in Embodiment 6.

In this case, the angle γ of the engagement portions 13b with an arcuate configuration of the rail cover 12 after the bending is, as shown in FIG. 17, is preferably set to 30 to 90 degrees, wherein the angle γ is the angle in the tangential direction of the arcuate surfaces at the positions where the end portion of the engagement portions 13b with an arcuate configuration are in contact with the upper track surfaces 5a serving as the engagement surfaces of the rail 2.

Due to this arrangement, after the attachment of the rail cover 12, the rail cover 12 and the upper surface 2a of the rail 2 bonded to each other by means of the adhesive tape 50, with the rail cover 12 pressurizing the upper surface 2a of the rail 2.

As described above, by forming the engagement portions of the rail cover in an arcuate configuration, it is also possible to obtain the same effect as that of Embodiment 6.

While in Embodiments 1 through 8, described above, beveled portions are provided at the corner portions made by the upper surface and the upper side surfaces of the rail, it is also possible to provide rounded portions. This allows smooth engagement when attaching the rail cover and helps to prevent generation of dents, flaws or the like in the corner portions during handling of the rail, etc.

Embodiment 9

Figure 18:
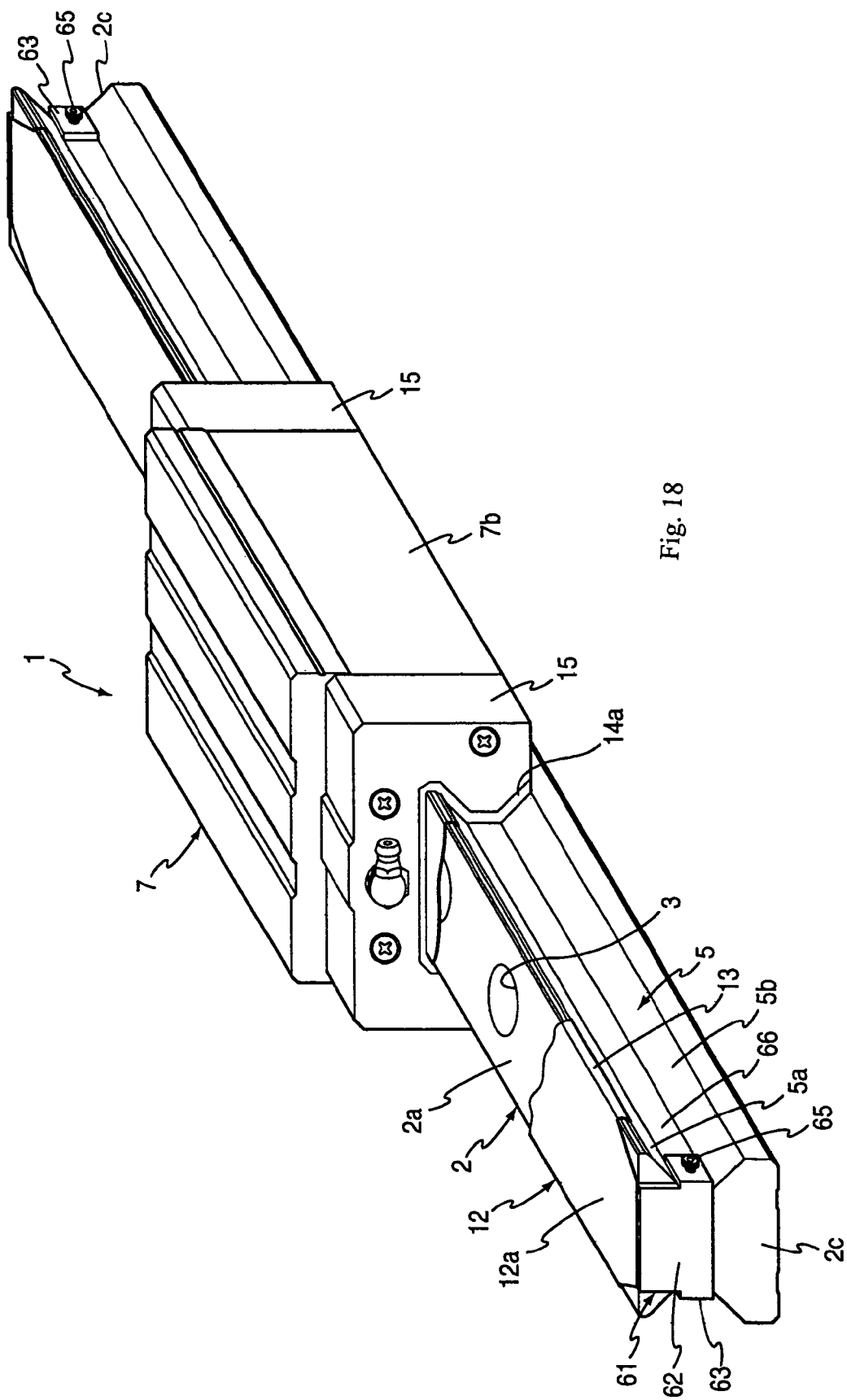
FIG. 18 is a perspective view of a linear guide device according to Embodiment 9 of the present invention.
Figure 19:
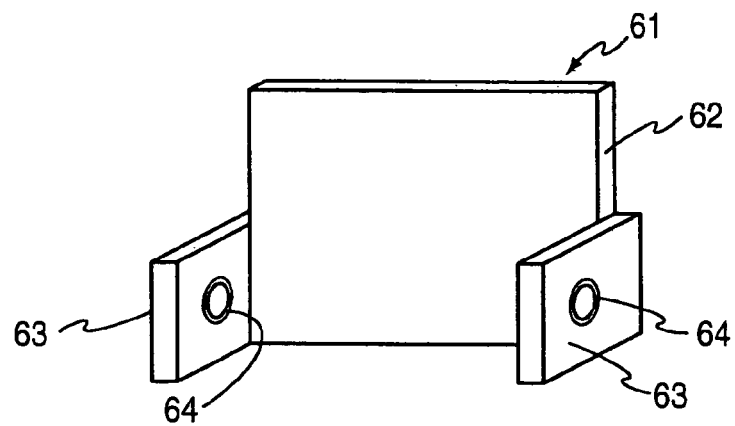
FIG. 19 is a perspective view of a cover stopper according to Embodiment 9.
Figure 20:
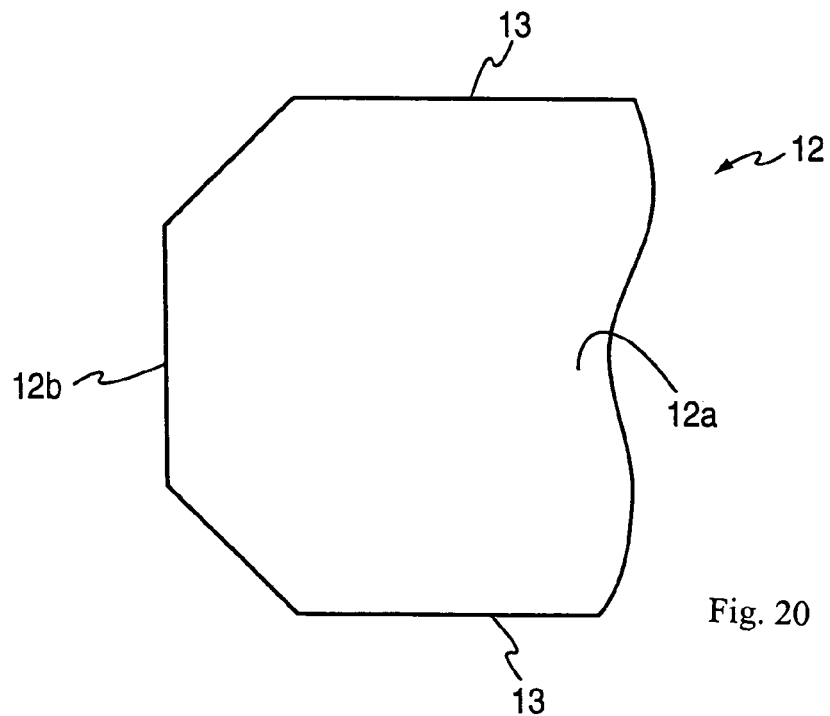
FIG. 20 is a top view of an end portion of a rail cover according to Embodiment 9.
Figure 21:
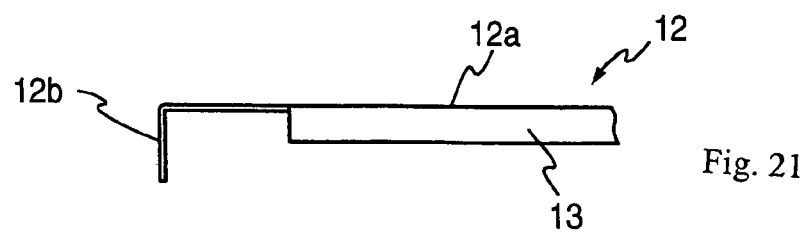
FIG. 21 is a side view of an end portion of a rail cover according to Embodiment 9.
Figure 22:
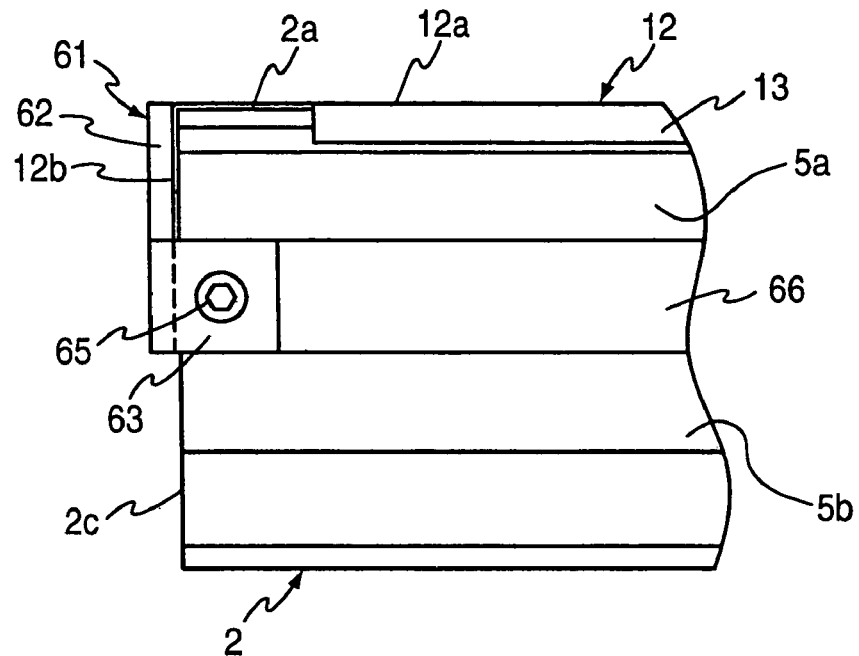
FIG. 22 is a side view showing how a cover stopper according to Embodiment 9 is attached.
Figure 23:
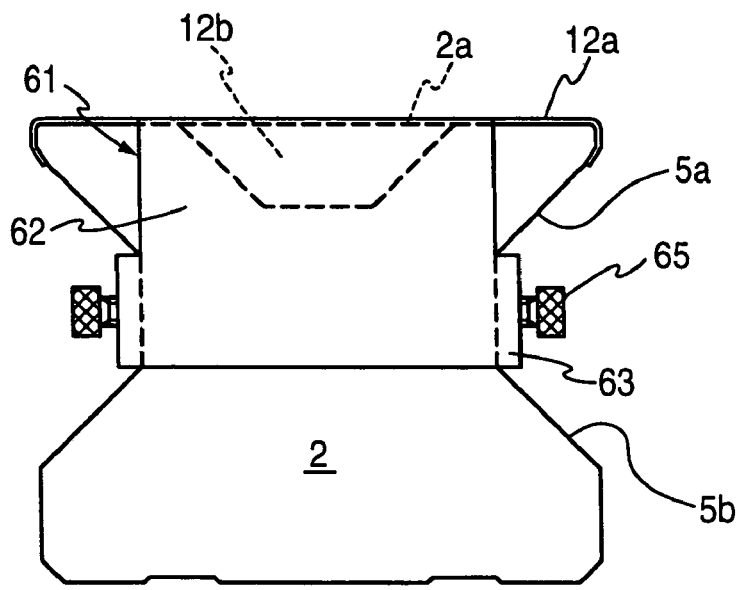
FIG. 23 is a front view showing how a cover stopper according to Embodiment 9 is attached.

FIG. 18 is a perspective view of a linear guide according to Embodiment 9; FIG. 19 is a perspective view of a cover stopper according to Embodiment 9; FIG. 20 is a top view of an end portion of a rail cover according to Embodiment 9; FIG. 21 is a side view of an end portion of a rail cover according to Embodiment 9; FIG. 22 is a side view showing how a cover stopper according to Embodiment 9 is attached; and FIG. 23 is a front view showing how a cover stopper according to Embodiment 9 is attached.

The components that are the same as those of Embodiment 1 are indicated by the same reference numerals and a description thereof will be omitted.

The seal portions 14a of the linear guide device 1 of this embodiment are directly fixed to the interior of end caps 15 by bonding, press-fitting or the like, forming a contact type seal in sliding contact with the outer peripheral surface formed by the rail 2 and the rail cover 12, preventing intrusion of dust from outside and leakage of lubricant from inside.

The rail cover 12 of this embodiment shown in FIGS. 20 and 21 are produced by using a thin plate of an alloy steel or the like by roll forming, etc. in substantially the same length as the longitudinal length of the rail 2, and the portion thereof between the side edge portions 13 extending in the longitudinal direction thereof is formed as a flat surface extending along the upper surface 2a of the rail 2, with a polyethylene type tape member for preventing damage during production or handling being attached to the cover upper surface 12a.

Further, both side edge portions 13 of the rail cover 12 are bent by an angle smaller than 90 degrees, and are engaged with the upper portions of the side surfaces of the rail 2 to prevent relative movement of the rail 2 and the rail cover 12 in a direction orthogonal to the slider moving direction; at the same time, the rail cover 12 covers the entire upper surface 2a of the rail 2, preventing accumulation of dust, etc. in the stepped bolt holes 3.

Further, both end portions of the rail cover 12 with respect to the slider moving direction are bent, starting with the corner portion made by the upper surface 2a and the end surface 2c of the rail 2, by an angle substantially the same as the angle made by the upper surface 2a and the end surface 2c of the rail 2 (90 degrees in this embodiment), and the end bent portion 12b is engaged with the rail end surface 2c to prevent relative movement of the rail 2 and the rail cover 12 in the slider moving direction.

In FIGS. 18 and 19, reference numeral 61 indicates a cover stopper, which is formed by press working of a relatively thick metal plate material of an alloy steel or the like, or by injection molding of a resin material, such as nylon or polyacetal, with a helisert being threadedly engaged with a screw portion; it is a substantially U-shaped member composed of a main body portion 62 and a pair of leg portions 63 extending from both side end portions thereof in the slider moving direction, with the rail cover 12 side portion of the main body portion 62 being formed so as to be substantially at the same level as the upper surface 12a of the rail cover 12.

Further, the cover stopper 61 is arranged at either end of the rail 2, with the inner side of the main body portion 62 abutting the outer side of the end bent portion 12b of the rail cover 12 engaged with either rail end surface 2c of the rail 2; as shown in FIGS. 22 and 23, by means of locking bolts 65 threadedly engaged with through screw holes 64 provided in the leg portions 63, the cover stopper 61 is fastened to cover stopper leg portion lock portions 66, which are flat surfaces between the upper track surfaces 5a and the lower track surfaces 5b provided in pairs on the side surfaces of the rail 2, and is thereby locked; this helps to prevent relative movement of the rail cover 12 in the slider moving direction when an a excessive force is applied to the rail cover 12, and to prevent the rail cover 12 from rising from the upper surface 2a of the rail 2 due to a frictional force as a result of abutment of the end bent portion 12b of the rail cover 12 against the main body portion 62.

Due to this arrangement, the leg portions 63 of the cover stopper 61 are locked in areas other than the upper track surfaces 5a and the lower track surfaces 5b on which the runners 6 roll, so that the cover stopper 61 can be secured in position at either end of the rail 2 without leaving any dent or flaw on the upper track surfaces 5a and the lower track surfaces 5b.

As described above, in this embodiment, the cover stopper is arranged at either end of the rail, with the inner side of the main body portion of the cover stopper abutting the end bent portion of the rail cover, and the cover stopper leg portions are locked to the cover stopper leg portion lock portions between the pairs of rail track surfaces, whereby the leg portions can be locked in areas other than the rail track surfaces on which the runner roll, making it possible to arrange the cover stopper at either end of the rail without leaving any dent or flaw on the rail track surfaces.

This proves particularly effective when performing reassembly after dismantling and inspecting the rail and the slider, making it possible to repeat dismantling and assembly any number of times without impairing the functions of the linear guide device.

Further, due to the construction in which the cover stopper is secured in position by pressurizing the cover leg portion lock portions by the bolts threadedly engaged with the screw holes provided in the leg portions, fixation is possible by the frictional force between the bolts and the cover stopper leg portion lock portions, making it possible to easily fix the cover stopper without having to perform any additional machining such as threading on the rail, thereby making it possible to simplify the rail machining.

Embodiment 10

Figure 24:
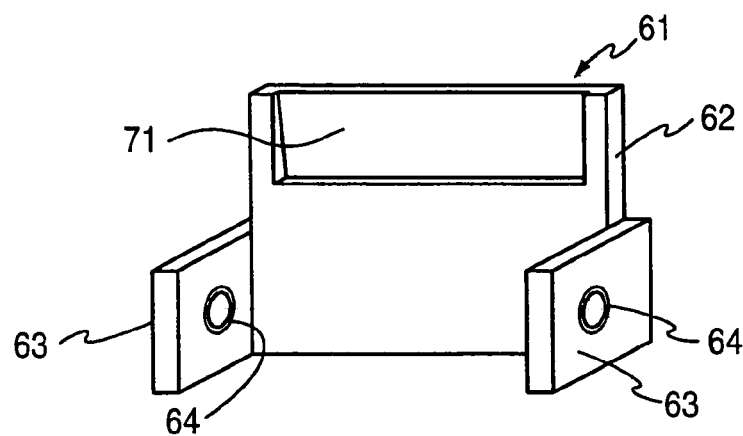
FIG. 24 is a perspective view of a cover stopper according to Embodiment 10 of the present invention.
Figure 25:
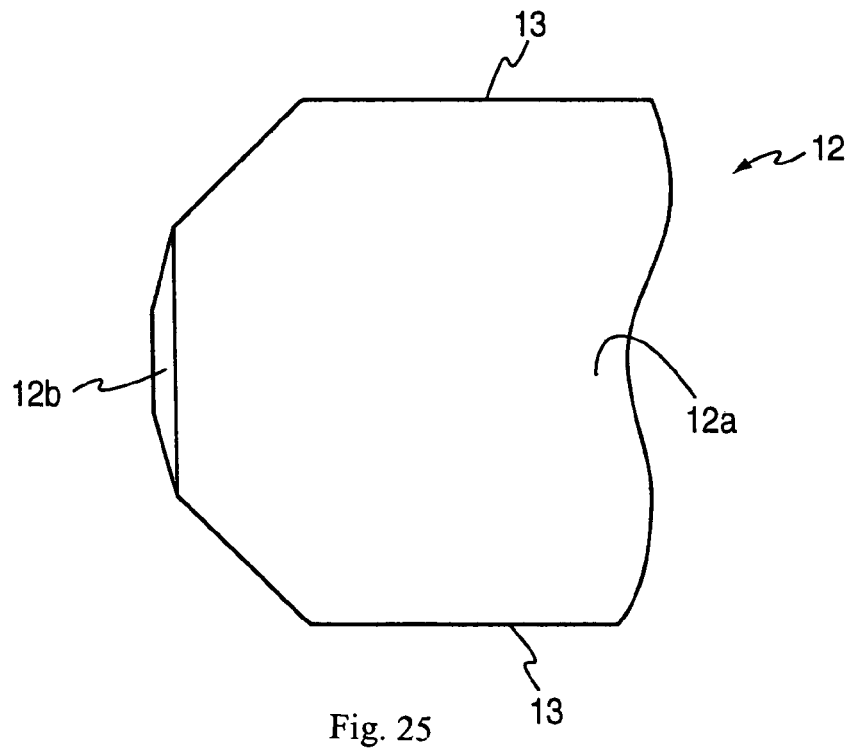
FIG. 25 is a top view of an end portion of a rail cover according to Embodiment 10.
Figure 26:
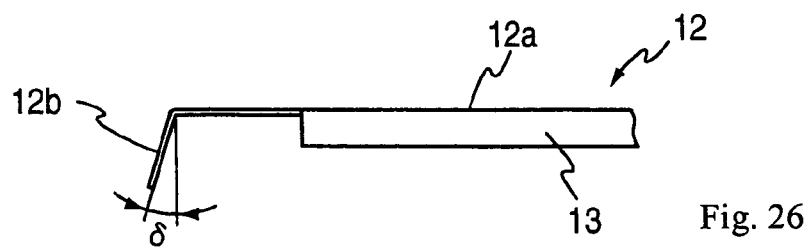
FIG. 26 is a side view of an end portion of a rail cover according to Embodiment 10.
Figure 27:
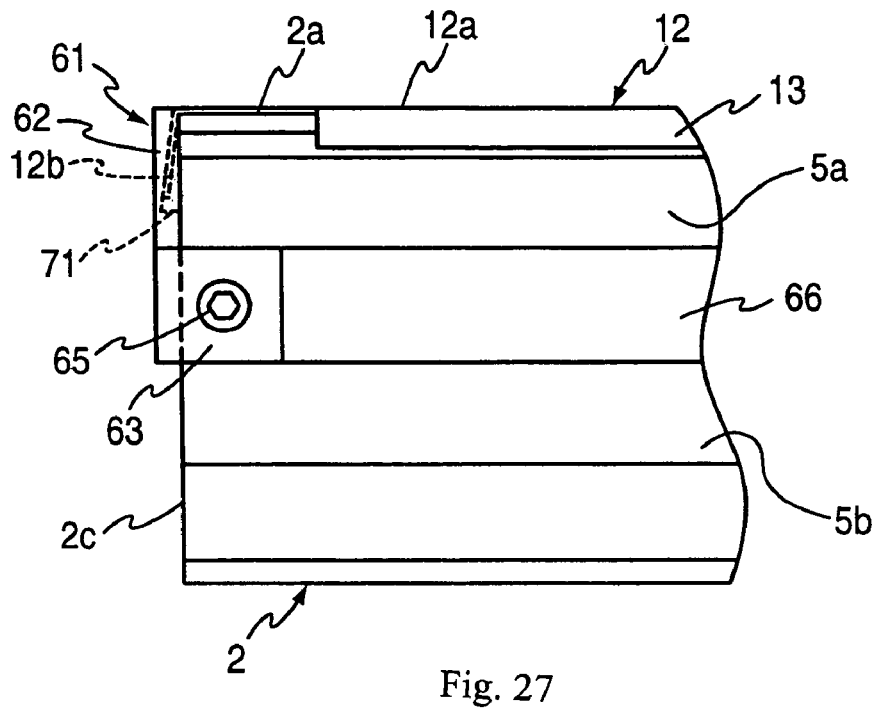
FIG. 27 is a side view showing how a cover stopper according to Embodiment 10 is attached.
Figure 28:
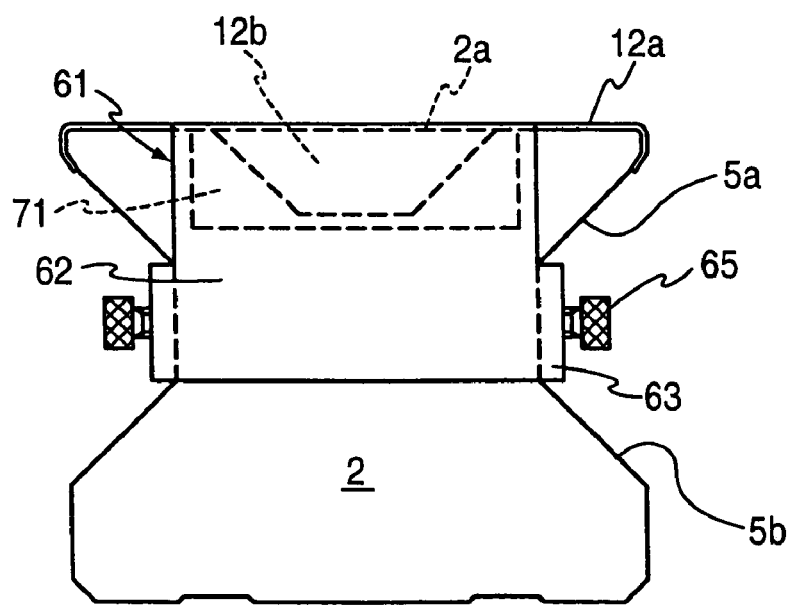
FIG. 28 is a front view showing how a cover stopper according to Embodiment 10 is attached.

FIG. 24 is a perspective view of a cover stopper according to Embodiment 10; FIG. 25 is a top view of an end portion of a rail cover according to Embodiment 10; FIG. 26 is a side view of an end portion of a rail cover according to Embodiment 10; FIG. 27 is a side view showing how a cover stopper according to Embodiment 10 is attached; FIG. 28 is a front view showing how a cover stopper according to Embodiment 10 is attached.

The components that are the same as those of Embodiments 1 and 9 are indicated by the same reference numerals, and a description thereof will be omitted.

The rail cover 12 of the embodiment shown in FIGS. 25 and 26 is produced in the same manner as that of Embodiment 9, and both end bent portions 12b thereof in the slider moving direction are bent, starting with the corner portions made by the upper surface 2a of the rail 2 and the rail end surfaces 2c, by an angle larger by an end portion bending angle δ shown in FIG. 26 than the angle made by the rail upper surface 2a and the rail end surfaces 2c (90 degrees in this embodiment).

In FIG. 24, reference numeral 71 indicates an abutment inclined portion of the cover stopper 61; it is provided on the inner side of the main body portion 62 of the substantially U-shaped cover stopper 61 produced in the same manner as in Embodiment 9, and is a recess with a slope formed by inclining the surface which the end bent portion 12b abuts by an angle smaller than the end portion bending angle δ.

The cover stopper 61 of this embodiment is arranged at either end of the rail 2, with the slope of the abutment inclined portion 71 on the inner side of the main body portion 62 abutting the outer side of the end bent portion 12b of the rail cover 12 engaged with the rail 2 by means of the side edge portion 13; as shown in FIGS. 27 and 28, as in Embodiment 9, the cover stopper 61 is locked by being fastened to the cover stopper leg portion lock portions 66 by means of the locking bolts 65 threadedly engaged with the through screw holes 64 of the leg portions 63, preventing relative movement of the rail cover 12 in the slider moving direction; at the same time, the end bent portion 12b of the rail cover 12 abuts the slope of the abutment inclined portion 71 formed at an angle smaller than its end portion bending angle δ, pressing the rail cover 12 against the rail upper surface 2a by the elasticity of the rail cover 12 to prevent it from rising.

Due to this arrangement, the leg portions 63 of the cover stopper 61 are locked in areas other than the upper track surfaces 5a and the lower track surfaces 5b on which the runners 6 roll, so that the cover stopper 61 can be secured in position at either end of the rail 2 without leaving any dent or flaw on the upper track surfaces 5a and the lower track surfaces 5b.

As described above, this embodiment provides the following effect in addition to the effect of Embodiment 9: the end bent portion of the rail cover is bent by an angle larger than the angle made by the upper surface of the rail and the rail end surface by the end portion bending angle δ, and the end bent portion is caused to abut the slope, inclined by an angle smaller than the end portion bending angle δ, of the abutment inclined portion provided on the inner side of the main body portion of the cover stopper, whereby it is possible to reliably prevent the rail cover from rising from the upper surface of the rail.

Embodiment 11

Figure 29:
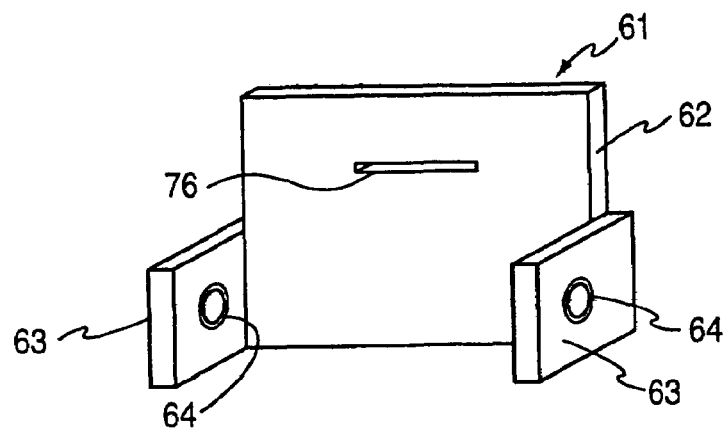
FIG. 29 is a perspective view of a cover stopper according to Embodiment 11 of the present invention.
Figure 30:
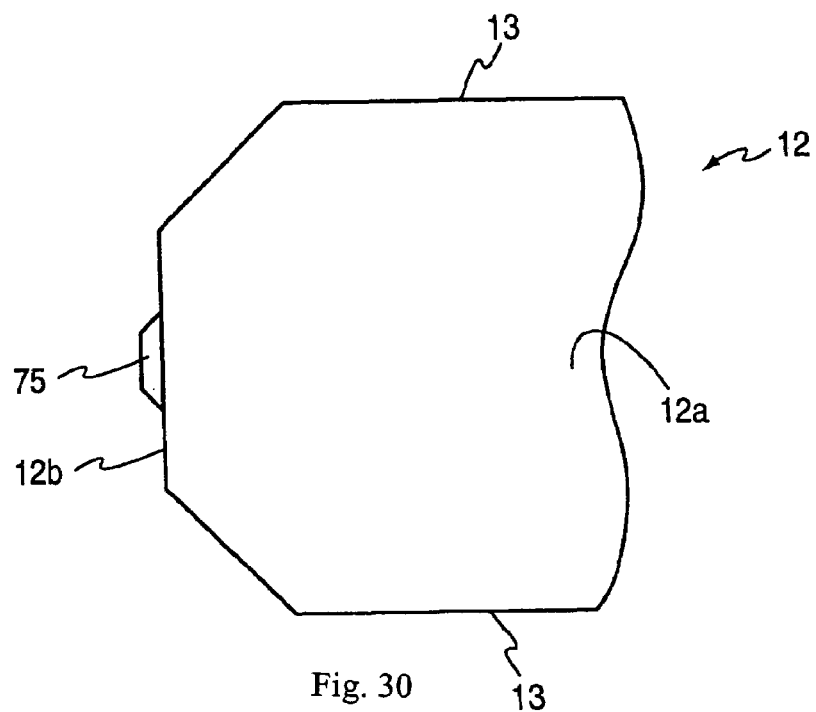
FIG. 30 is a top view of an end portion of a rail cover according to Embodiment 11.
Figure 31:
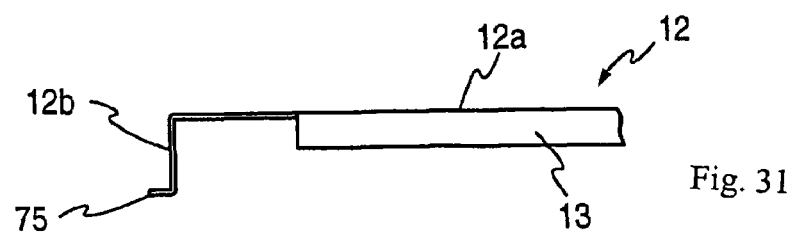
FIG. 31 is aside view of an end portion of a rail cover according to Embodiment 11.
Figure 32:
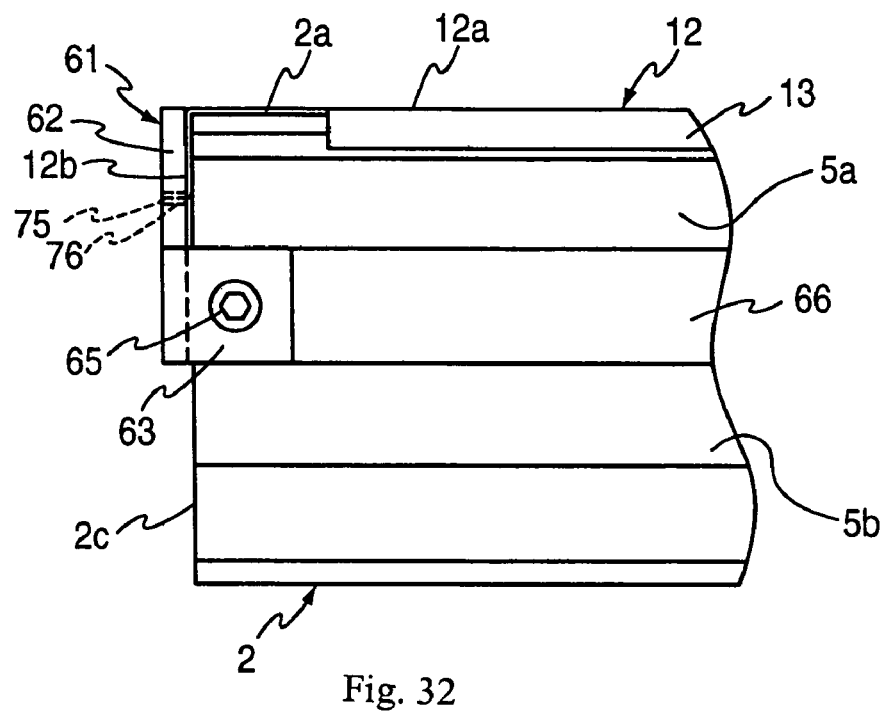
FIG. 32 is a side view showing how a cover stopper according to Embodiment 11 is attached.
Figure 33:
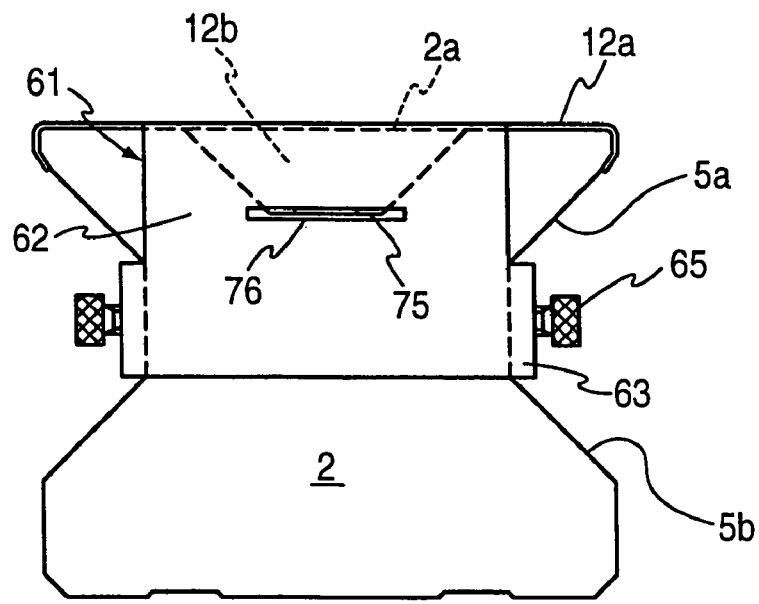
FIG. 33 is a front view showing how a cover stopper according to Embodiment 11 is attached.

FIG. 29 is a perspective view of a cover stopper according to Embodiment 11; FIG. 30 is a top view of an end portion of a rail cover according to Embodiment 11; FIG. 31 is a side view of an end portion of a rail cover according to Embodiment 11; FIG. 32 is a side view showing how a cover stopper according to Embodiment 11 is attached; FIG. 33 is a front view showing how a cover stopper according to Embodiment 11 is attached.

The components that are the same as those of Embodiments 1 and 9 are indicated by the same reference numerals, and a description thereof will be omitted.

The rail cover 12 shown in FIGS. 30 and 31 are produced in the same manner as in Embodiment 9; at the forward end of each of both end bent portions 12b bent as in Embodiment 9, there is provided a tip tongue 75 which is parallel to the upper surface 2a of the rail 2 and which is bent in a direction opposite to the rail end surface 2c.

In FIG. 29, reference numeral 76 indicates a tongue engagement portion of the cover stopper 61; it is provided in the main body portion 62 of the substantially U-shaped cover stopper 61 produced in the same manner as in Embodiment 9, and is a slit-like hole to be engaged with the tip tongue 75 provided at the end bend portion 12b of the rail cover 12.

The cover stopper 61 of this embodiment is arranged at either end of the rail 2, with the inner side of the main body portion 62 abutting the outer side of the end bent portion 12b of the rail cover 12 engaged with each of both rail ends 2c of the rail 2 as in Embodiment 9, and the tip tongue 75 of the end bent portion 12b being inserted into the tongue engagement portion 76; as shown in FIGS. 32 and 33, as in Embodiment 9, the cover stopper is locked by being fastened to the cover stopper leg portion lock portions 66 by means of the locking bolts 65 threadedly engaged with the through screw holes 64 of the leg portions 63, preventing relative movement of the rail cover 12 in the slider moving direction, and, at the same time, the tip tongue 75 of the end bent portion 12b of the rail cover 12 is engaged with the tongue engagement portion 76, preventing the rail cover 12 from rising from the upper surface 2a of the rail 2.

Due to this arrangement, the leg portions 63 of the cover stopper 61 are locked in areas other than the upper track surfaces 5a and the lower track surfaces 5b on which the runners 6 roll, so that the rail cover 12 can be more reliably prevented from rising and the cover stopper 61 can be secured in position at either end of the rail 2 without leaving any dent or flaw on the upper track surfaces 5a and the lower track surfaces 5b.

As described above, in addition to the effect of Embodiment 9, this embodiment provides the following effect: the tip tongue formed by bending the forward end portion of the bent end portion of the rail cover in a direction opposite to the rail end surface, it is possible to more reliably prevent the rail cover from rising from the upper surface of the rail.

Embodiment 12

Figure 34:
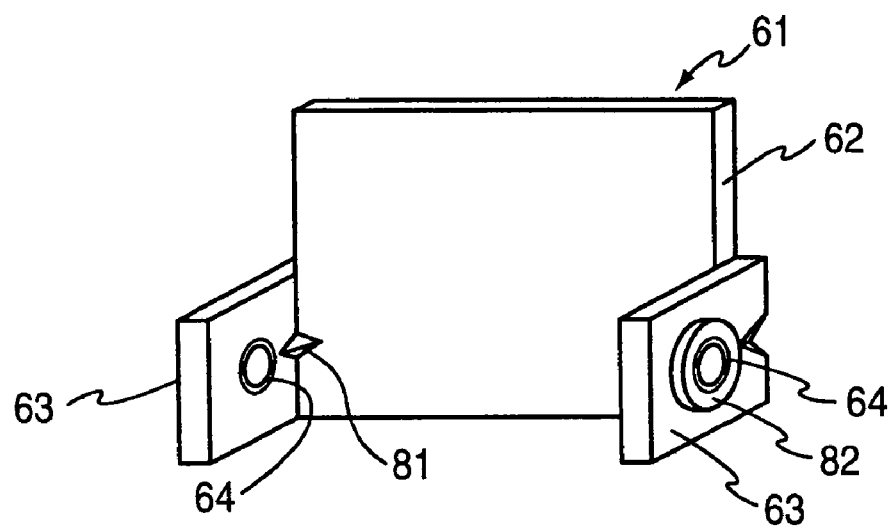
FIG. 34 is a perspective view of a cover stopper according to Embodiment 12 of the present invention.

FIG. 34 is a perspective view of a cover stopper according to Embodiment 12.

The rail cover 12 of this embodiment is the same as that of Embodiment 9. Further, the components that are the same as those of Embodiments 1 and 9 are indicated by the same reference numerals, and a description thereof will be omitted.

In FIG. 34, reference numeral 81 indicates ribs of the cover stopper 61, which are formed by pushing the outer corners of the main body portion 62 and the leg portions 63 of the cover stopper 61 by press working or the like to raise the inner corners on the inner side thereof to raise them into a triangular configuration; they function so as to enhance the rigidity of the leg portions 63.

Reference numeral 82 indicates bosses, which are protrusions formed in the periphery of the through screw holes 64 of the leg portions 63 of the cover stopper 61, and are produced by drawing out of small holes by burring or the like prior to threading to form thick-walled portions in the periphery, functioning so as to enhance the strength of the through screw holes 64 formed there.

Due to this arrangement, in addition to the effect of Embodiment 9, this embodiment provides the following effect: by enhancing the rigidity of the leg portions of the cover stopper by the ribs and enhancing the screw strength of the screw holes by the bosses, it is possible to enhance the fastening strength of the cover stopper with respect to the cover stopper leg portion engagement portions.

Embodiment 13

Figure 35:
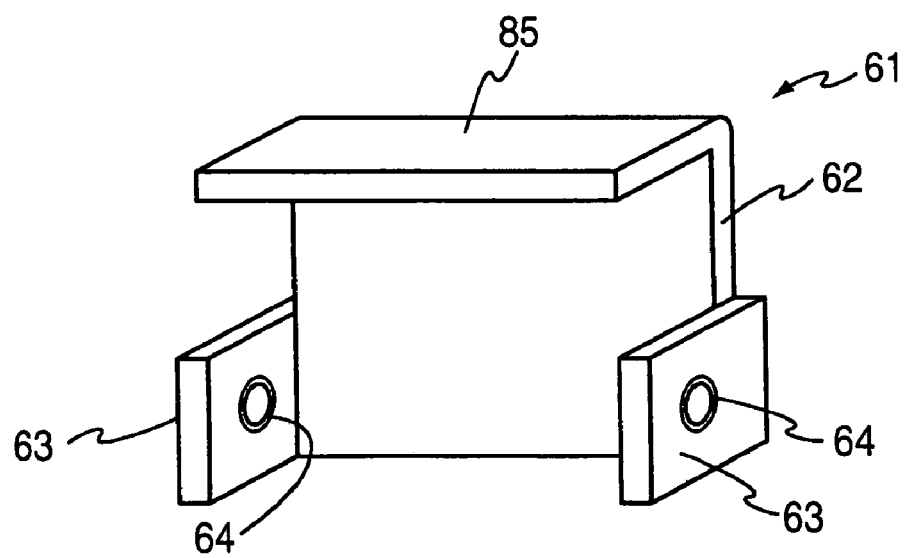
FIG. 35 is a perspective view of a cover stopper according to Embodiment 13 of the present invention.

FIG. 35 is a perspective view of a cover stopper according to Embodiment 13.

The rail cover 12 of this embodiment is the same as that of Embodiment 9. Further, the components that are the same as those of Embodiments 1 and 9 are indicated by the same reference numerals, and a description thereof will be omitted.

In FIG. 35, reference numeral 85 indicates a cover protecting portion of the cover stopper 61; it is an eaves-like portion formed by bending the portion of the main body portion 62 on the rail cover upper surface 12a side of the substantially U-shaped cover stopper 61 produced in the same manner as in Embodiment 9 in the slider moving direction; it functions so as to cover the cut surface at the end of the rail cover 12 to protect that portion from damage or the like, and at the same time, to prevent the assembly operator from being injured by the cut surface.

Due to this arrangement, in addition to an effect similar that of Embodiment 9, this embodiment provides the following effect: the cut surface of the cover end portion is covered with the cover protecting portion of the cover stopper, thereby making it possible to prevent damage of the rail cover end portion and injuring of the assembly operator.

Embodiment 14

Figure 36:
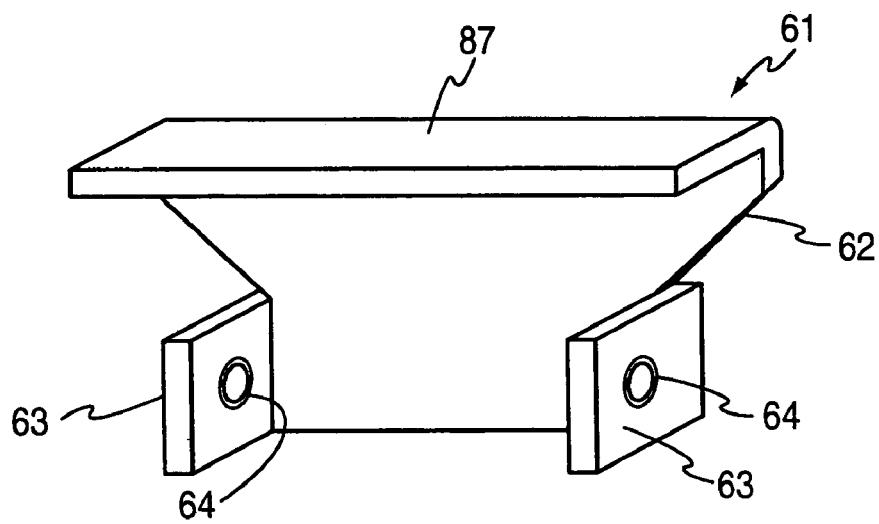
FIG. 36 is a perspective view of a cover stopper according to Embodiment 14 of the present invention.
Figure 37:
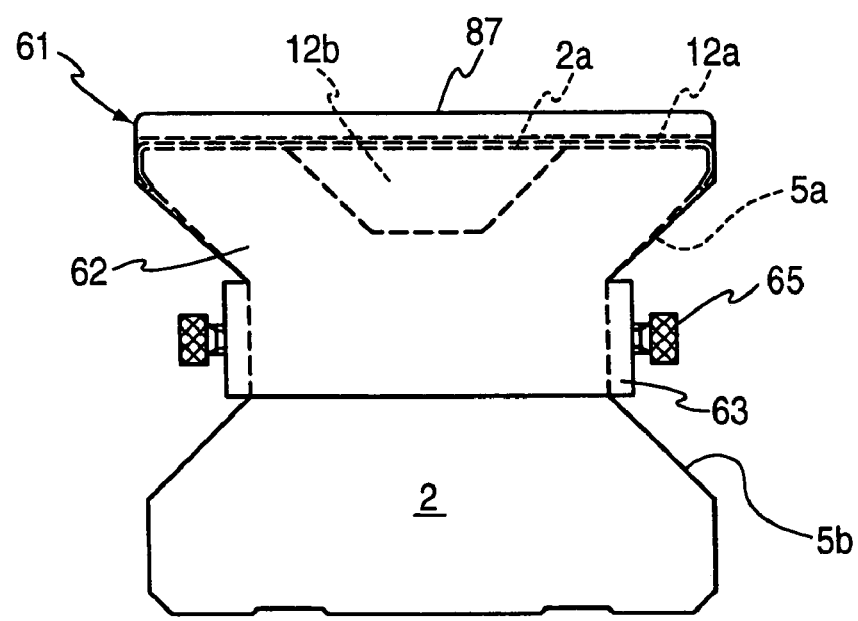
FIG. 37 is a front view showing how a cover stopper according to Embodiment 14 is attached.

FIG. 36 is a perspective view of a cover stopper according to Embodiment 14; and FIG. 37 is a front view showing how a cover stopper according to Embodiment 14 is attached.

The rail cover 12 of this embodiment is the same as that of Embodiment 9. Further, the components that are the same as those of Embodiments 1 and 9 are indicated by the same reference numerals, and a description thereof will be omitted.

In FIG. 36, reference numeral 87 indicates a cover protecting portion of the cover stopper 61; it is an eaves-like portion produced in the same manner as in Embodiment 13, and is formed so as to cover the end portion of the cover upper surface 12a of the rail cover 12 substantially over the entire length in the width direction thereof, functioning so as to protect the cut surface of the end portion of the rail cover 12 from damage or the like and protect the assembly operator from injury by the cut surface.

Due to this arrangement, this embodiment helps to further enhance the effect of Embodiment 13.

Embodiment 15

Figure 38:
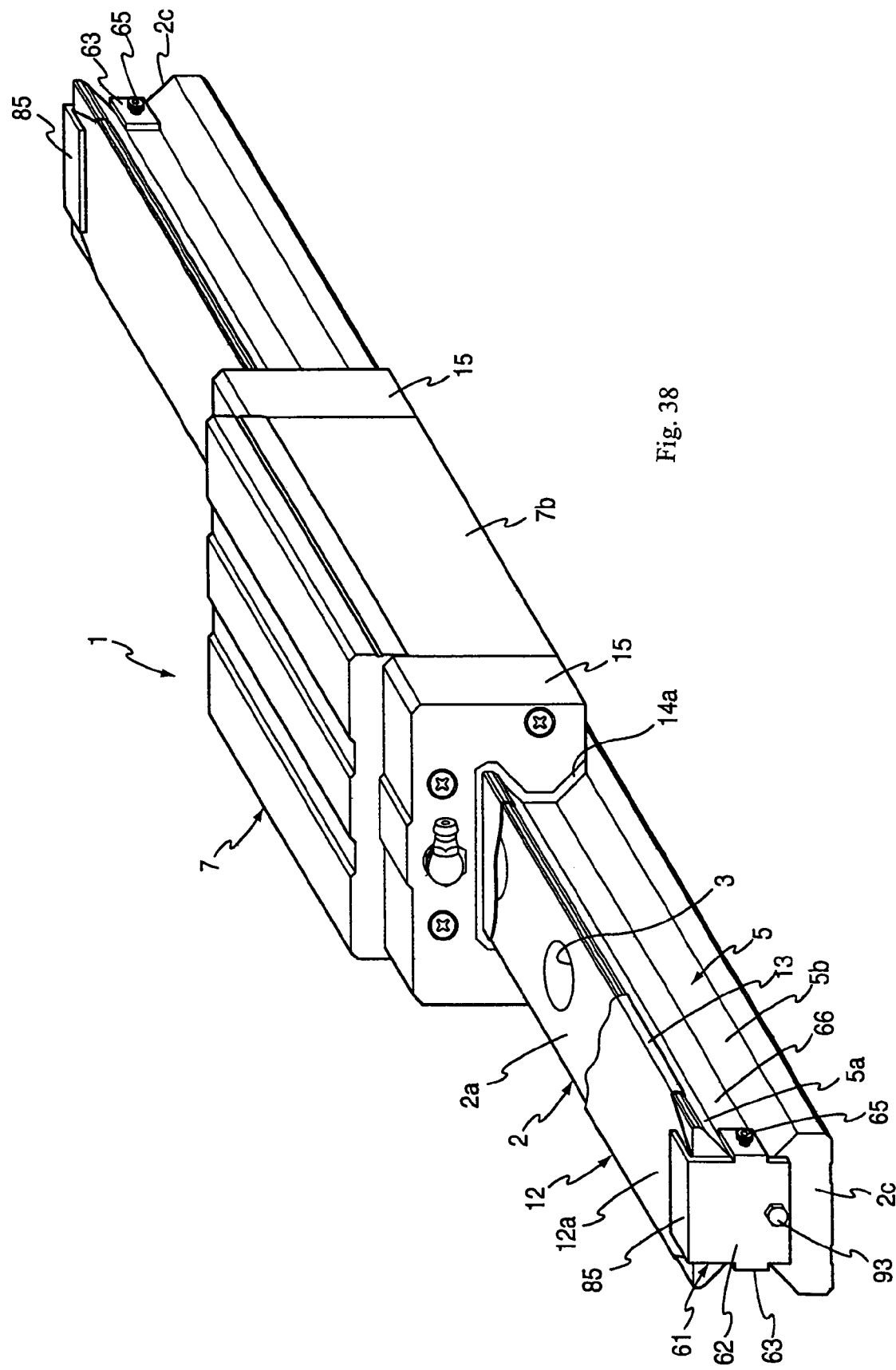
FIG. 38 is a perspective view of a linear guide device according to Embodiment 15 of the present invention.
Figure 39:
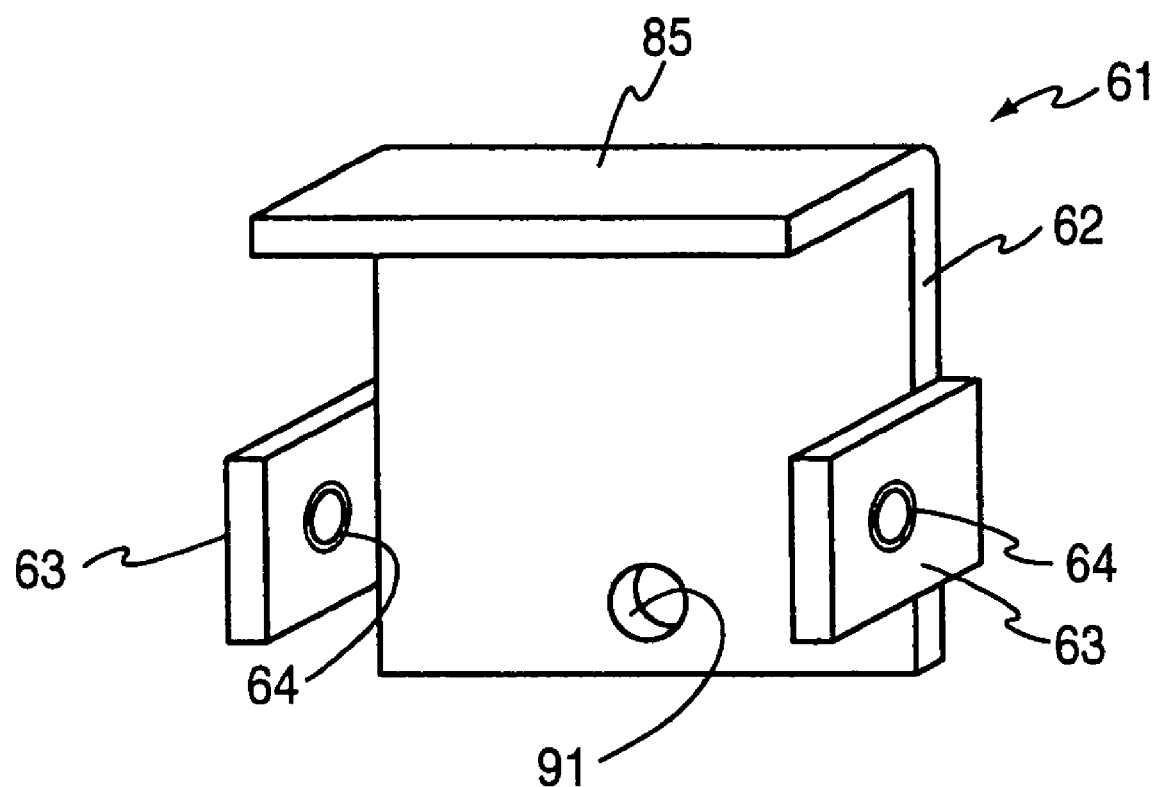
FIG. 39 is a perspective view of a cover stopper according to Embodiment 15.
Figure 40:
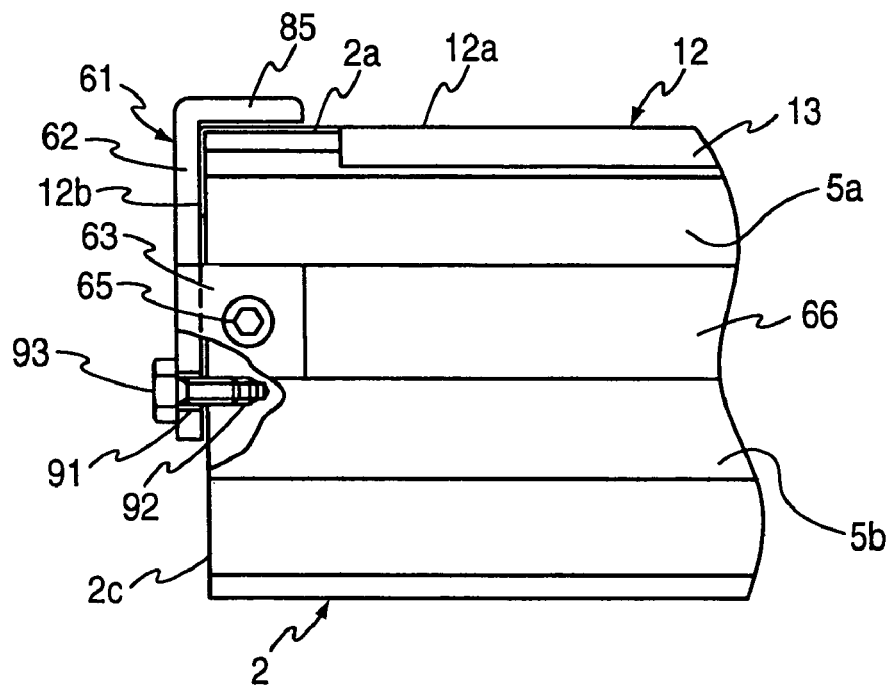
FIG. 40 is a side view showing how a cover stopper according to Embodiment 15 is attached.
Figure 41:
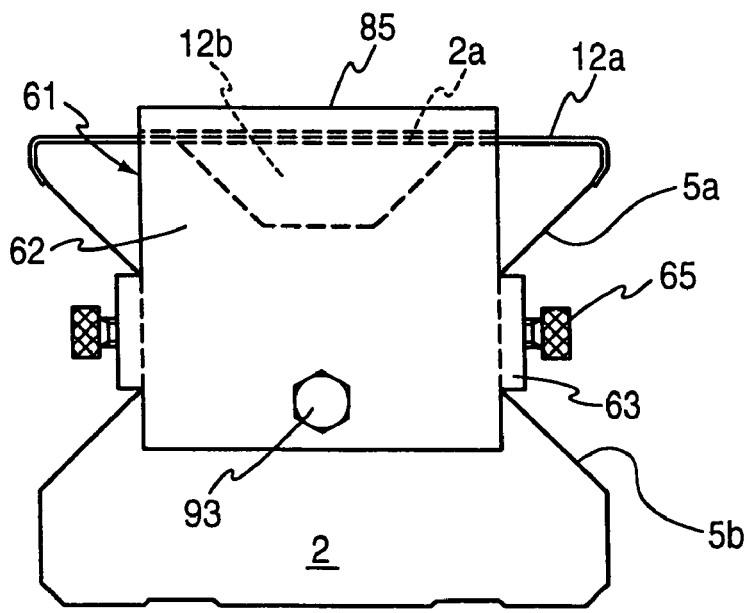
FIG. 41 is a front view showing how a cover stopper according to Embodiment 15 is attached.

FIG. 38 is a perspective view of a linear guide according to Embodiment 15; FIG. 39 is a perspective view of a cover stopper according to Embodiment 15; FIG. 40 is a front view showing how a cover stopper according to Embodiment 15 is attached; and FIG. 41 is a front view showing how a cover stopper according to Embodiment 15 is attached.

The rail cover 12 of this embodiment is the same as that of Embodiment 9. The components that are the same as those of Embodiment 1, Embodiment 9, and Embodiment 13 are indicated by the same reference numerals and a description thereof will be omitted.

In FIG. 39, reference numeral 91 indicates a bolt hole of the cover stopper 61; it is a through-hole extending in the thickness direction provided in the main body portion 62 of the cover stopper 61 produced in the same manner as in Embodiment 13.

In FIG. 40, reference numeral 92 indicates a stopped screw hole provided in the end surface 2c of the rail 2; a bolt 93 inserted into the bolt hole 91 of the cover stopper 61 is threadedly engaged therewith for fastening.

As shown in FIG. 38, the cover stopper 61 of this embodiment is arranged at either end of the rail 2, with the inner side of the main body portion 62 abutting the outer side of the end bent portion 12b of the rail cover 12 engaged with the rail end surface 12c; as shown in FIGS. 40 and 41, by means of the bolt 93, fastening is effected, with the end bent portion 12b being sandwiched between the main body portion 62 of the cover stopper 61 and the end surface 2c of the rail 2; thereafter, the cover stopper 61 is locked by being fastened to the cover stopper leg portion lock portions 66 of the rail 2 by means of the locking bolts 65 threadedly engaged with the through screw holes 64 of the leg portions 63.

Due to this arrangement, the leg portions 63 of the cover stopper 61 are locked in areas other than the upper track surfaces 5a and the lower track surfaces 5b on which the runners 6 roll, so that the cover stopper 61 can be secured in position at either end of the rail 2 without leaving any dent or flaw on the upper track surfaces 5a and the lower track surfaces 5b; and, at the same time, when the slider 7 moves to the end portion of the rail 2 and the seal portion 14a abuts the rail end surface 2c of the cover protecting portion 35 with respect to the slider moving direction, it is possible to prevent the slider 7 from being detached from the rail 2 by the cover stopper 61 fixed by the locking bolts 65 and the bolt 93.

Further, due to the arrangement in which the cover stopper 61 is arranged at either end of the rail, with the end bent portion 12b of the rail cover 12 being sandwiched between the main body portion 62 of the cover stopper 61 and the rail end surface 2c of the rail 2, it is possible to firmly prevent relative movement of the rail cover 12 in the slider moving direction through cooperation of the locking bolts 65 and the bolt 93 when an excessive force is applied to the rail cover 12; and, at the same time, it is possible to prevent the rail cover 12 from rising from the rail upper surface 2a of the rail 2.

As described above, in addition to the effect of Embodiment 13, this embodiment provides the following effect: by fastening the main body portion to the rail end surface of the rail by means of the bolt holes provided in the main body portion of the cover stopper, it is possible to prevent the slider from being detached from the rail, and at the same time, it is possible to sandwich the rail end bent portion of the rail cover between the main body portion and the end surface of the rail, making it possible to reliably prevent relative movement of the rail cover in the slider moving direction and rising of the rail cover from the rail upper surface of the rail.

Embodiment 16

Figure 42:
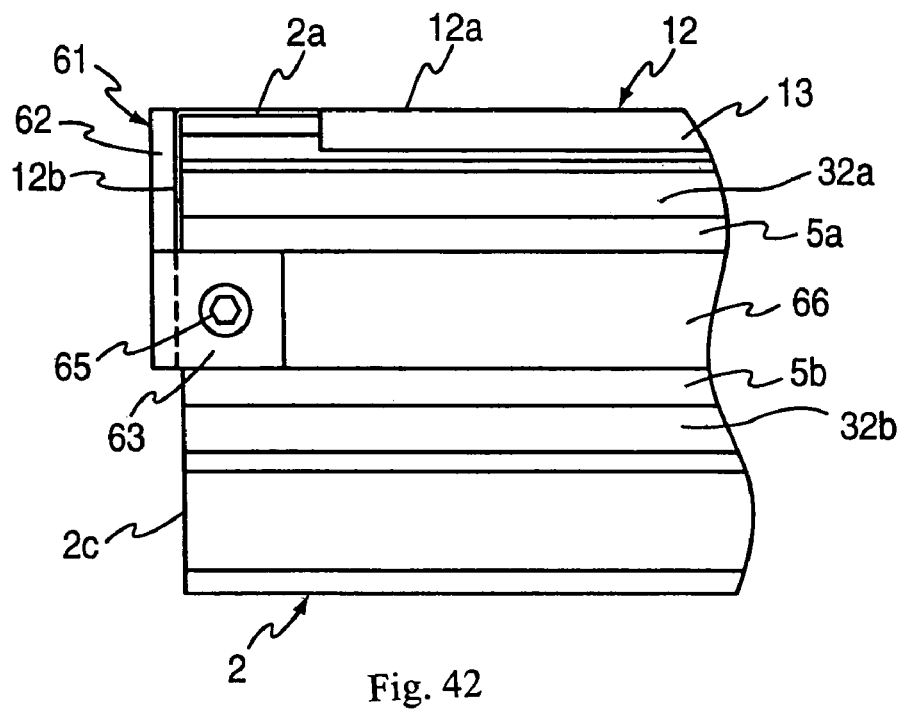
FIG. 42 is a side view showing how a cover stopper according to Embodiment 16 of the present invention is attached.
Figure 43:
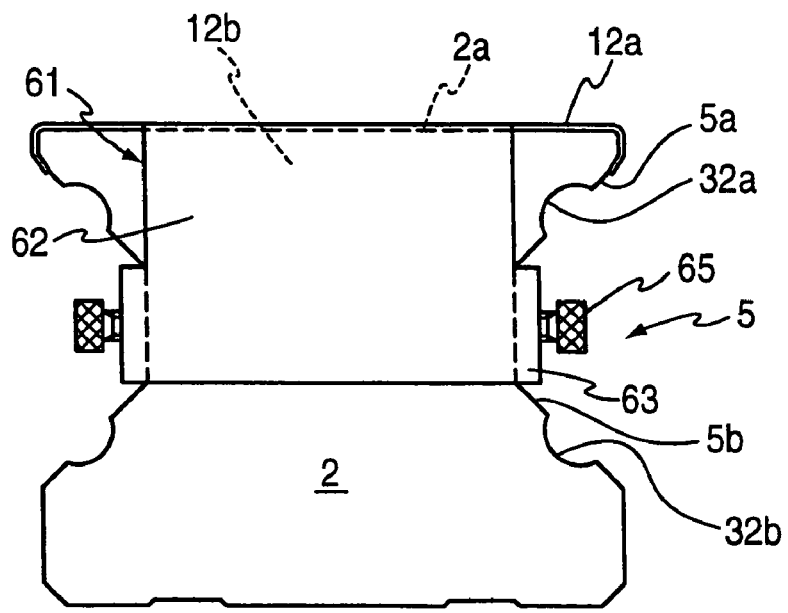
FIG. 43 is a front view showing how a cover stopper according to Embodiment 16 is attached.

FIG. 42 is a side view showing how a cover stopper according to Embodiment 16 is attached; and FIG. 43 is a front view showing how the cover stopper according to Embodiment 16 is attached.

The rail cover 12 and the cover stopper 61 of this embodiment are the same as those of Embodiment 9. Further, the components that are the same as those of Embodiment 1, Embodiment 4, and Embodiment 9 are indicated by the same reference numerals, and a description thereof will be omitted.

FIGS. 42 and 43 show a pair of rail track grooves 32a and 32b, which are substantially arcuate grooves provided, as in Embodiment 4, in the upper track surfaces 5a and the lower track surfaces 5b so as to extend in the longitudinal direction of the track recesses on both sides of the rail 2 and in which the balls 31, serving as the rolling members, roll.

Further, formed in the inner surfaces of both side walls 7b of the slider 7 are slider track grooves as rolling surfaces (not shown) opposed to the rail track grooves 32a and 32b through the intermediation of balls 31.

Further, formed between the slider track grooves and the rail track grooves 32a and 32b, opposed to each other, are rolling paths on which the balls 31 roll and which support the load of the slider 7 moving on the rail 2.

The cover stopper 61 of this embodiment is arranged at either end of the rail 2, as in Embodiment 9, and function in the same manner as the cover stopper 61 of Embodiment 9.

As described above, in this embodiment, it is possible to obtain the same result as that of Embodiment 9 even with a linear guide device using balls as the rolling members.

While in Embodiments 9 through 16 described above the leg portions of the cover stopper are locked to the cover stopper leg portion lock portions by means of screws, it is also possible to lock them through pressurization of the cover stopper lock portions by utilizing the elasticity of the leg portions. This helps to simplify the cover stopper.

Further, the techniques regarding the cover stopper described with reference to Embodiments 9 through 16 can be used in an appropriate combination; through combination of each of the technique, it is possible to obtain their respective effects can be exerted synergistically.

While in each of the above-described embodiments the upper surface of the rail is set horizontally, the same is true of the case in which the rail upper surface is set in the vertical direction, or upside down, or inclined.

What is claimed is:

1. A linear guide device comprising: a rail having on both side surfaces thereof a track recess with a track surface formed thereon; a rail cover covering a rail upper surface of the rail; a saddle-like slider moving linearly on the rail; and a rolling member circulating through a connection path provided in the slider and adapted to roll on the track surface of the rail, wherein the rail cover is equipped with a side edge portion having an engagement portion, wherein the track recess is provided in a lower portion of an upper side surface of the rail, an upper track surface of the track recess being a slope gradually diminishing in a width direction of the rail downwardly from the upper side surface, and wherein said engagement portion of the rail cover is engaged with the upper track surface of the track recess.

2. A linear guide device according to claim 1, wherein an adhesive tape is provided at least on the rail upper surface of the rail between the rail upper surface and the rail cover, and wherein the rail cover is bonded to the rail by adhesive tape.

3. A linear guide device according to claim 1, wherein the upper side surface and a lower side surface of the rail are flush with each other.

4. A linear guide device according to claim 1, wherein cutout portions are provided at at least one of front and rear ends with respect to a slider moving direction of both side edge portions of the rail cover, the cutout portions being formed by cutting a part of the side edge portions obliquely toward a cover end surface.

5. A linear guide device comprising: a rail having on both side surfaces thereof a track recess with a track surface formed thereon; a rail cover covering a rail upper surface of the rail; a saddle-like slider moving linearly on the rail; and a rolling member circulating through a connection path provided in the slider and adapted to roll on the track surface of the rail, wherein the rail cover is equipped with a side edge portion having an engagement portion, wherein an engagement surface is provided in a lower portion of an upper side surface of the rail, the engagement surface being a slope gradually diminishing in a width direction of the rail downwardly from the upper side surface, and wherein said engagement portion of the rail cover is engaged with a corner portion made by the engagement surface and the upper side surface.

6. A linear guide device according to claim 5, wherein an adhesive tape is provided at least on the rail upper surface of the rail and between the rail upper surface and the rail cover, and wherein the rail cover is bonded to the rail by the adhesive tape.

7. A linear guide device according to claim 5, wherein the engagement surface comprises an upper track surface of the track recess of the rail.

8. A linear guide device according to claim 5, wherein the side surface and a lower side surface of the rail are flush with each other.

9. A linear guide device according to claim 5, wherein cutout portions are provided on both side edge portions of the rail cover at at least one of the front or rear ends with respect to a slider moving direction, the cutout portions comprising a cut in the side edge portions, wherein said side edge portions extend obliquely toward a cover end surface.

10. A linear guide device comprising: a rail having on both side surfaces thereof a track recess with a track surface formed thereon; a rail cover covering a rail upper surface of the rail; a saddle-like slider moving linearly on the rail; and a rolling member circulating through a connection path provided in the slider and adapted to roll on the track surface of the rail, wherein the rail cover is equipped with a side edge portion having an engagement portion, wherein an engagement surface is provided in a corner portion made by an upper side surface of the rail and an upper track surface of the track recess, the engagement surface being a slope gradually diminishing in a width direction of the rail downwardly from the upper side surface, and wherein said engagement portion of the rail cover is engaged with the engagement surface.

11. A linear guide device according to claim 10, wherein an adhesive tape is provided at least on the rail upper surface of the rail and between the rail upper surface and the rail cover, and wherein the rail cover is bonded to the rail by the adhesive tape.

12. A linear guide device according to claim 10, wherein the upper side surface and a lower side surface of the rail are flush with each other.

13. A linear guide device according to claim 10, wherein cutout portions are provided on both side edge portions of the rail cover at at least one of the front or rear ends with respect to a slider moving direction, the cutout portions being formed by cutting a part of the side edge portion obliquely toward a cover end surface.

* * * * *